United States Patent [19]

Irvin

[11] Patent Number: 5,007,793
[45] Date of Patent: Apr. 16, 1991

[54] BULK CONTAINERS AND APPARATUS FOR LOADING BULK CONTAINERS ONTO A TRUCK

[76] Inventor: John M. Irvin, 2905 Dolphin Dr., Miramar, Fla. 33025

[21] Appl. No.: 396,579

[22] Filed: Aug. 21, 1989

[51] Int. Cl.$^5$ ............................. B60P 1/36; B60P 1/44
[52] U.S. Cl. ..................................... 414/502; 414/528
[58] Field of Search ............... 414/501, 502, 527, 528, 414/540, 541, 545, 549

[56] References Cited

U.S. PATENT DOCUMENTS

| | | | |
|---|---|---|---|
| 2,099,998 | 11/1937 | Berg | 414/501 X |
| 2,211,721 | 8/1940 | Gerosa et al. | 414/541 X |
| 2,235,727 | 3/1941 | Pearlman | 414/540 |
| 2,422,768 | 6/1947 | Benn | 414/528 |
| 2,442,549 | 6/1948 | Pearlman | 414/501 |
| 2,513,355 | 7/1950 | Peckinpaugh | 414/545 X |
| 2,521,727 | 9/1950 | Kappen | 414/501 |
| 2,593,717 | 4/1952 | Barrott, Jr. et al. | 414/540 |
| 2,873,869 | 2/1959 | Neaverson | 414/549 |
| 3,109,544 | 11/1963 | Learmont | 414/549 |
| 3,363,790 | 1/1968 | Nelson | 414/501 |
| 4,372,723 | 2/1983 | DeCoene et al. | 414/502 X |
| 4,642,018 | 2/1989 | LeRoux et al. | 414/502 |

FOREIGN PATENT DOCUMENTS

| | | | |
|---|---|---|---|
| 2332085 | 1/1975 | Fed. Rep. of Germany | 414/502 |
| 171256 | 11/1934 | Switzerland | 414/541 |
| 1050930 | 10/1983 | U.S.S.R. | 414/502 |
| 1168448 | 7/1985 | U.S.S.R. | 414/502 |
| 145115 | 6/1920 | United Kingdom | 414/528 |

Primary Examiner—Robert J. Spar
Assistant Examiner—Robert S. Katz
Attorney, Agent, or Firm—Joseph C. Mason, Jr.; Ronald E. Smith

[57] ABSTRACT

Bulk containers of unitary construction and bulk containers formed of separate parts that interfit with one another to form a unitary structure and an apparatus that lifts the containers from a first support surface and suspends them in queued relation to one another above a second support surface. The first support surface may be a loading dock and the second support surface may be the bed of a truck. A plurality of rearwardly extending hook members are positioned on opposite sides of the truck bed at the rearward end of the truck. The hook members rotate in a vertical plane, and lift the container members, one at a time, from the first support surface by engaging outer roller members that extend laterally from opposite sides of each container. The hook members deliver the containers to horizontally disposed chain members that extend the length of the truck bed on both sides of the truck. The track members are rotatably mounted and carry the suspended containers, by engaging plural inner roller members disposed on opposite sides of the containers, toward the front of the truck bed so that the entire truck bed may be filled with the bulk containers.

23 Claims, 26 Drawing Sheets

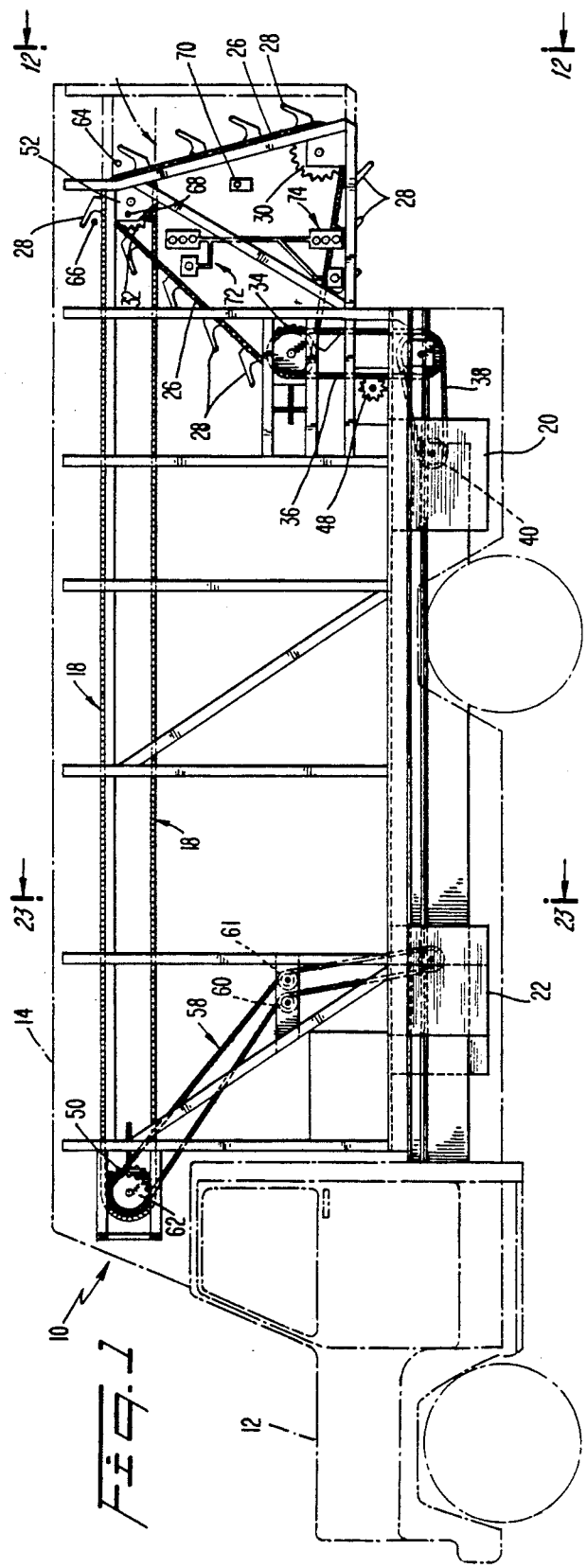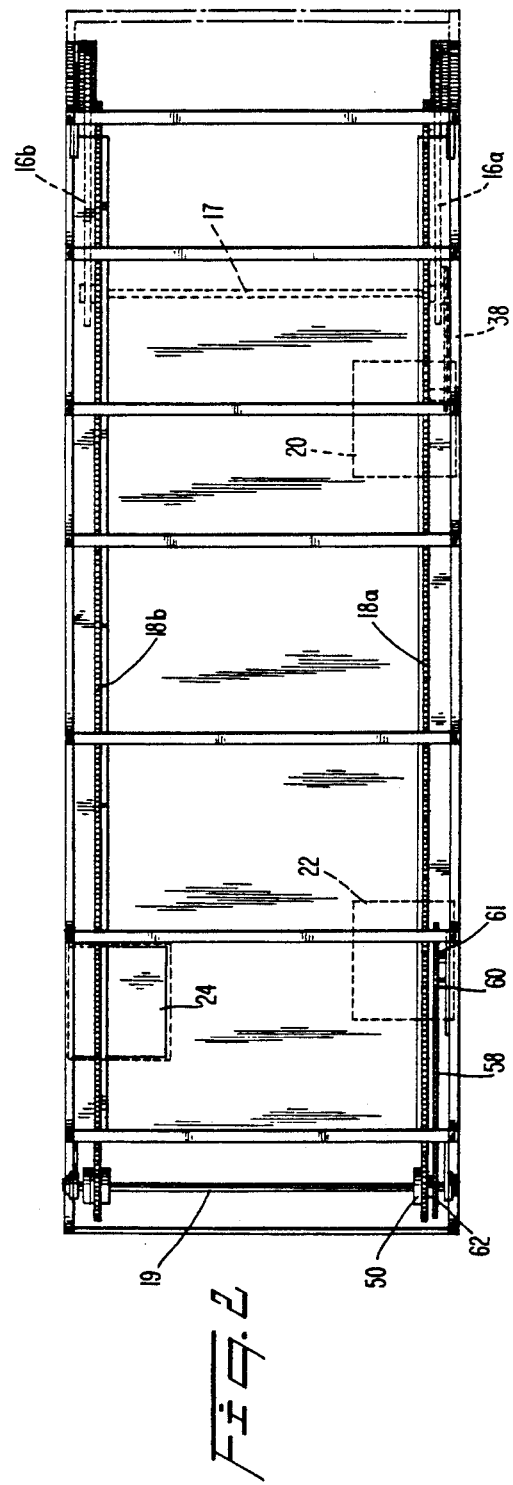

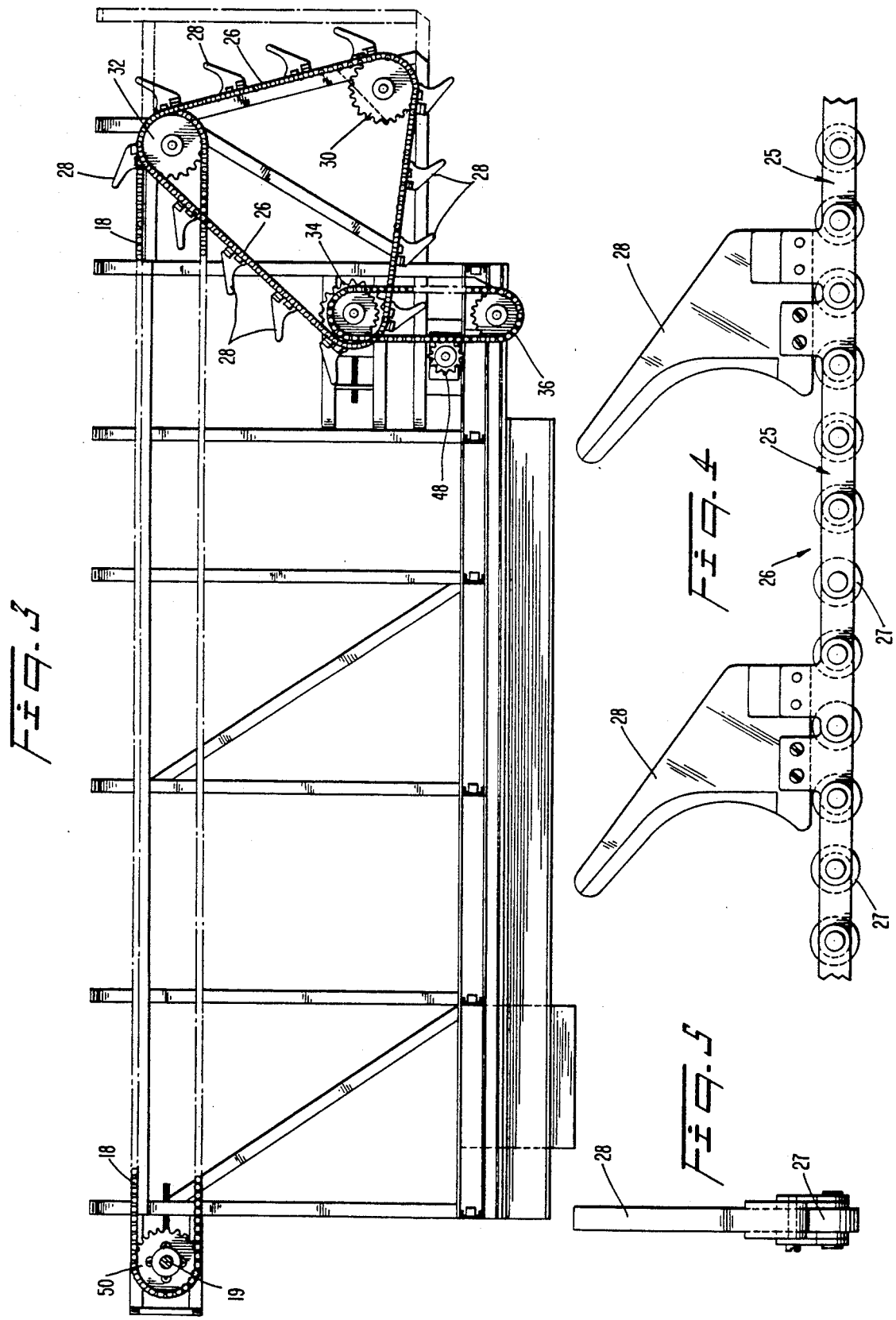

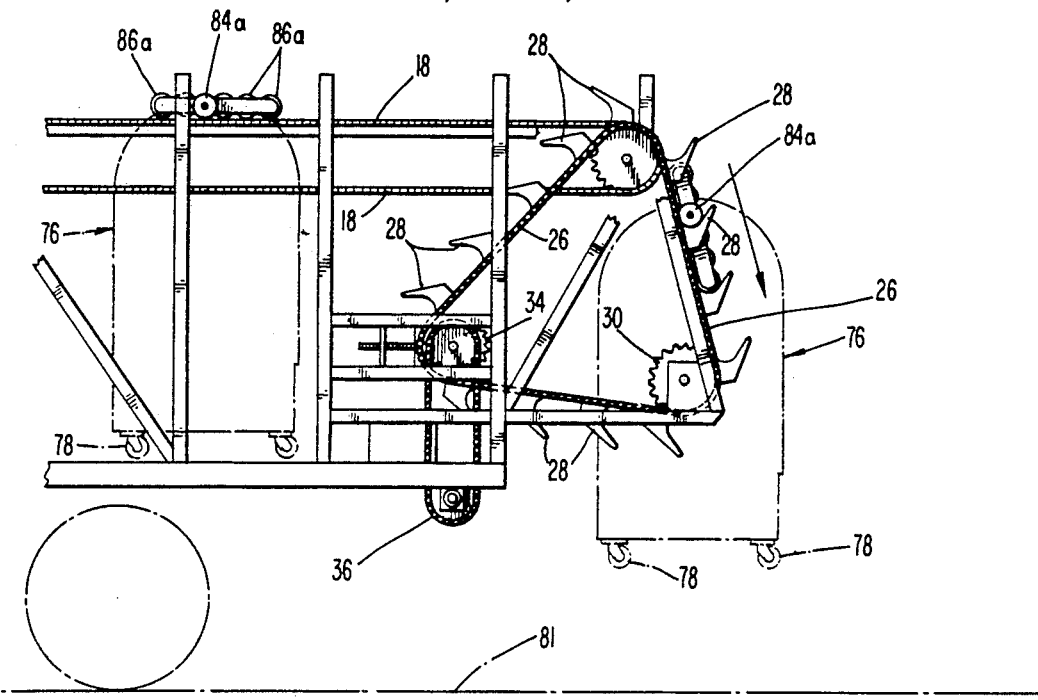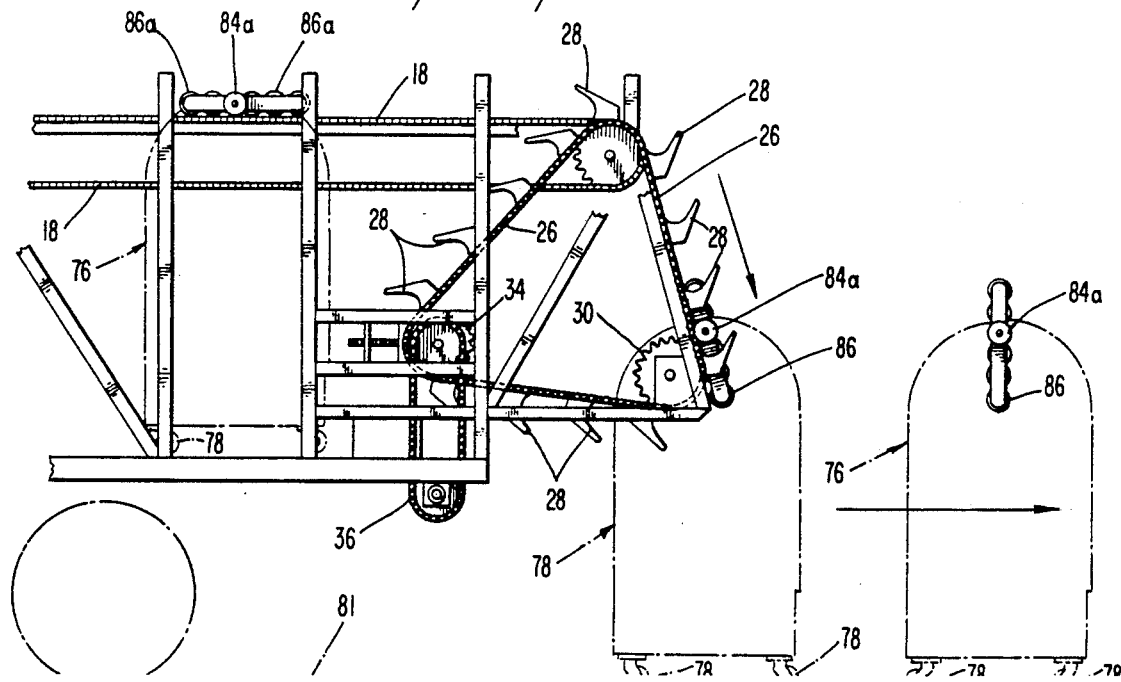

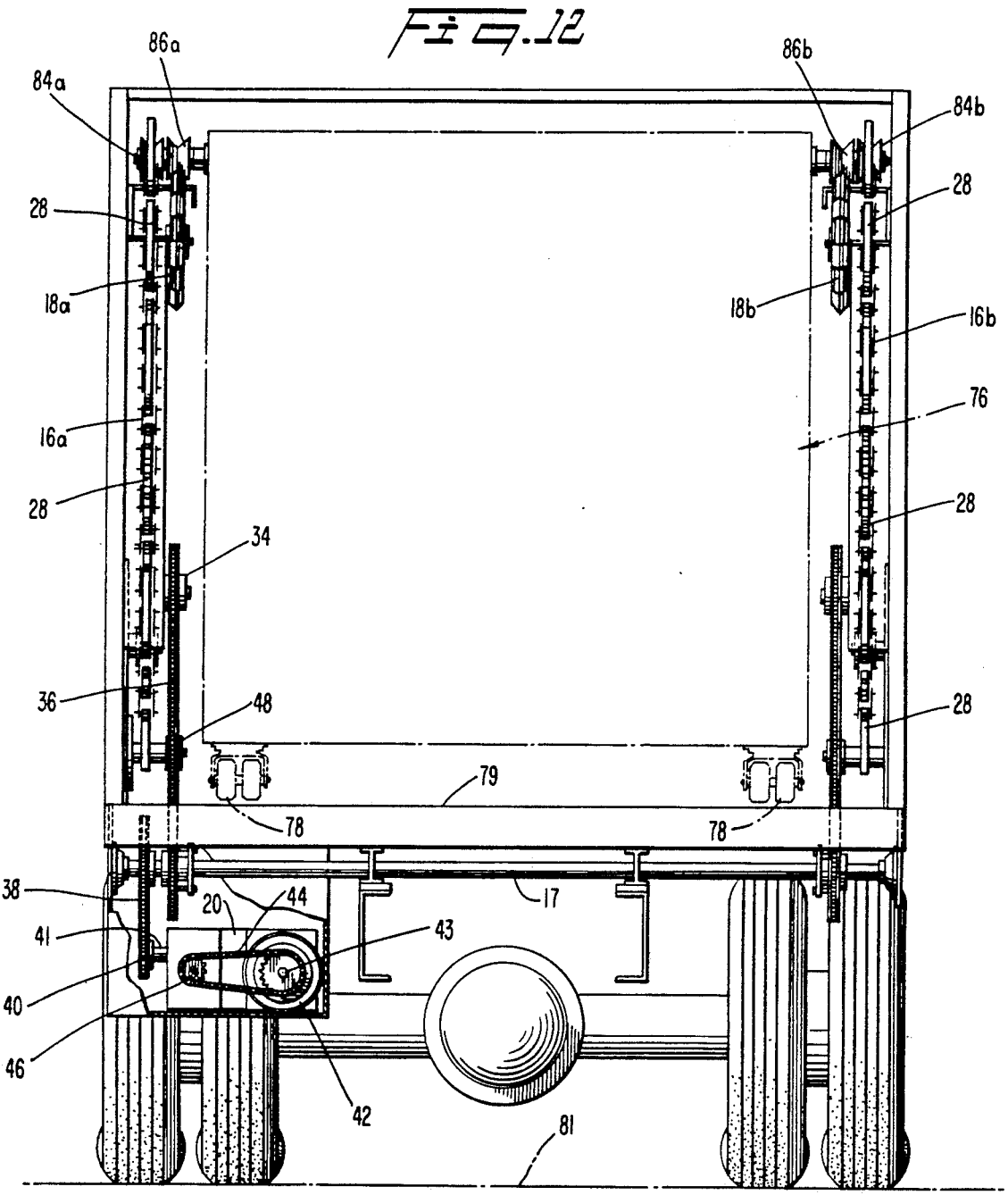
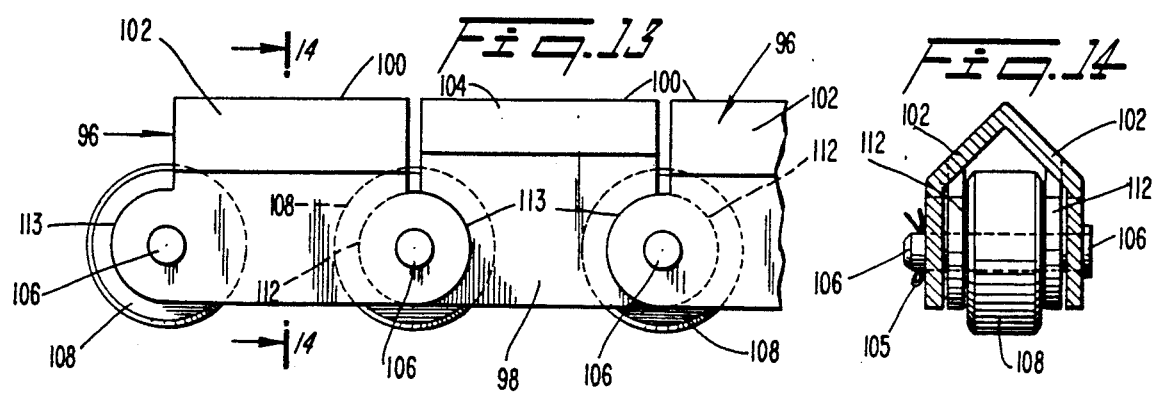

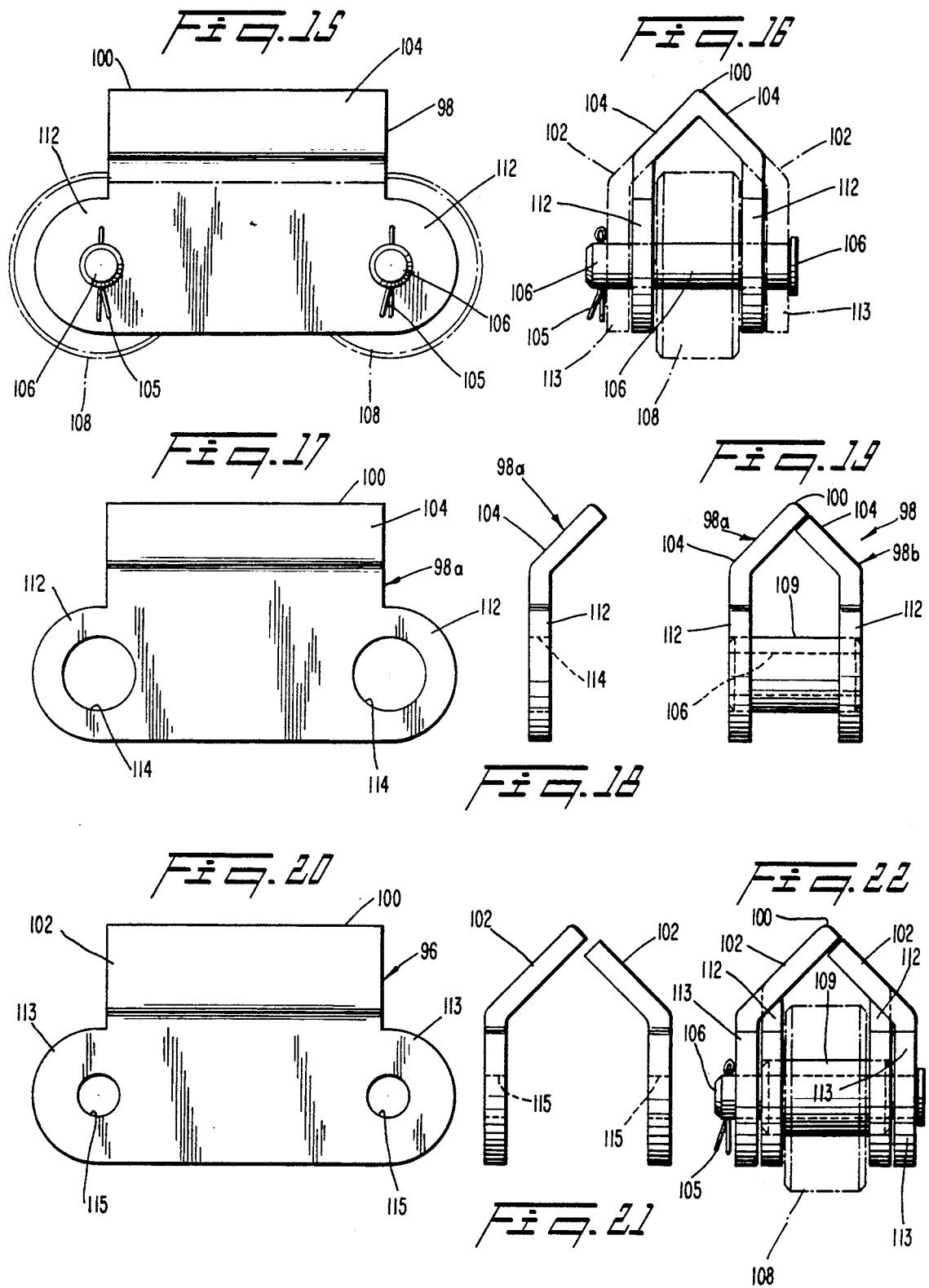

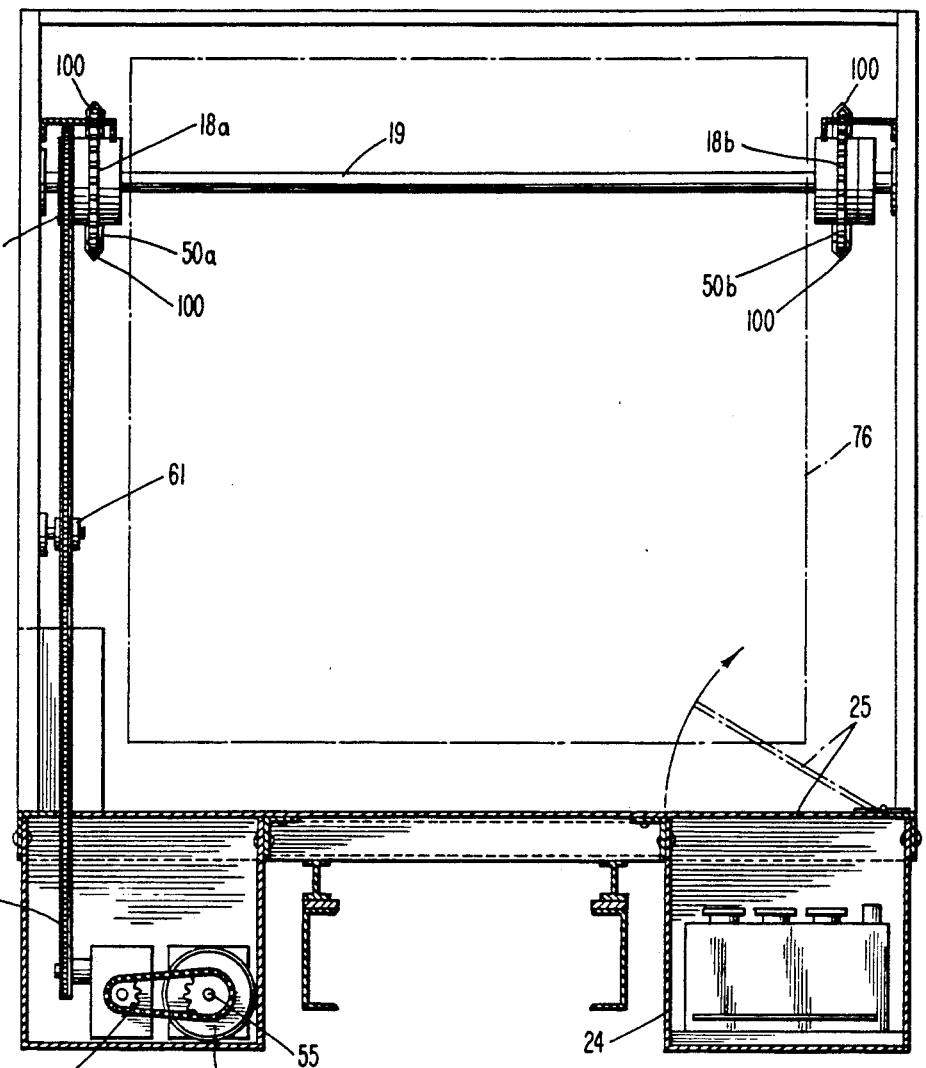
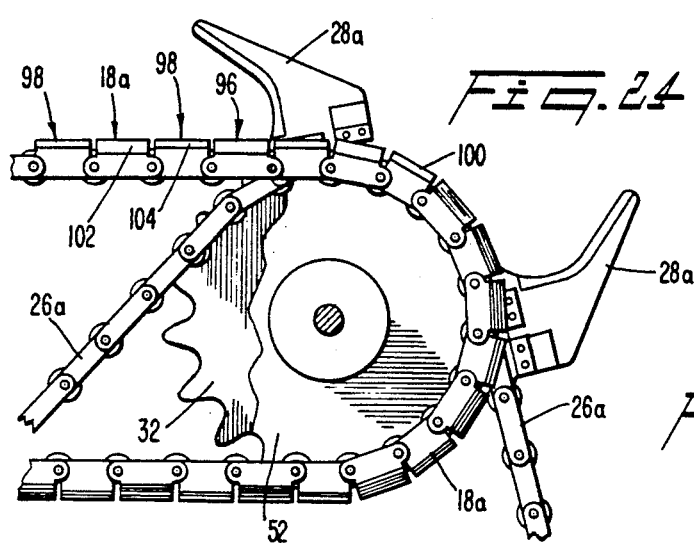
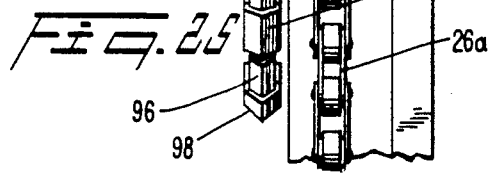

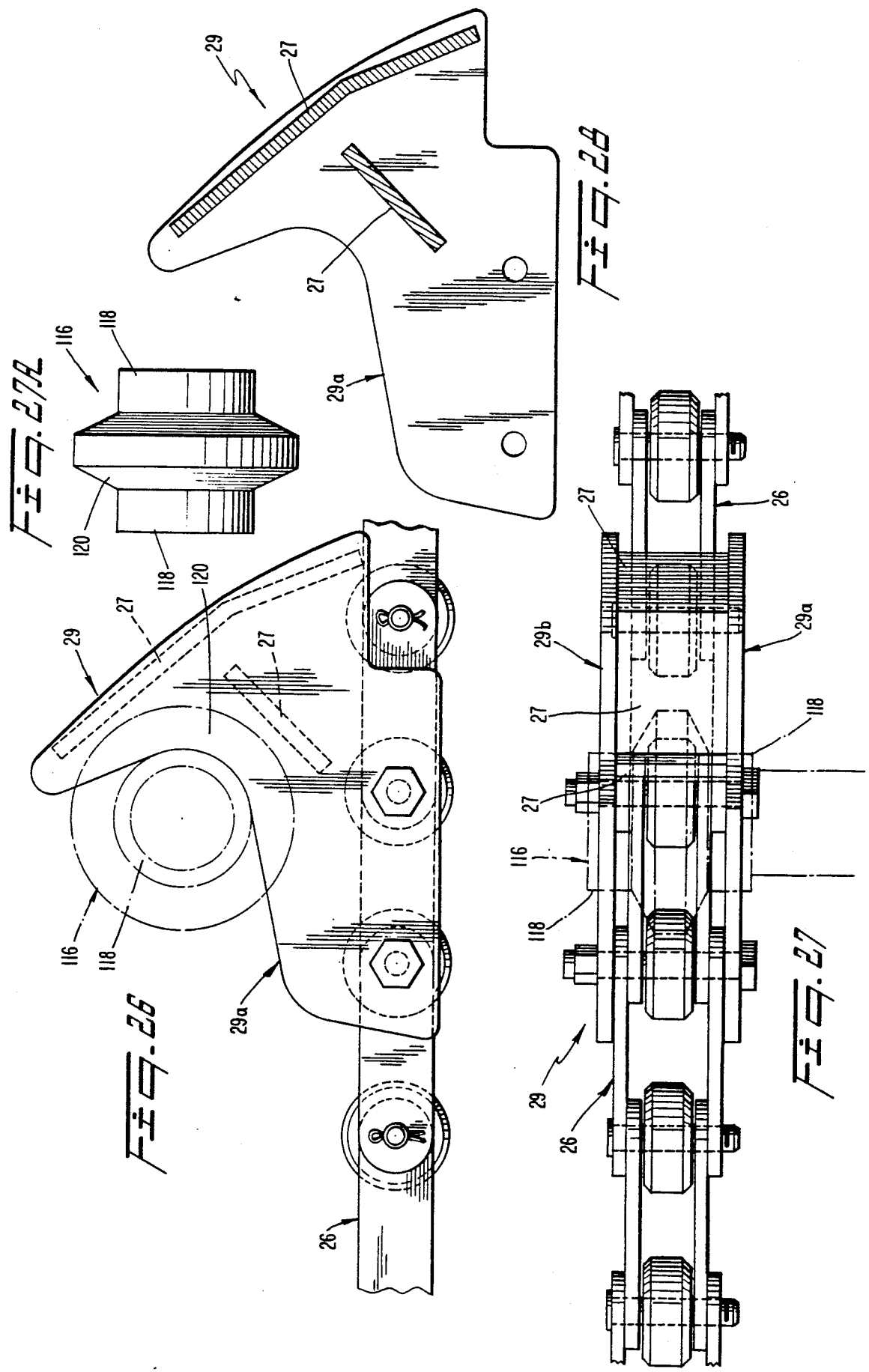

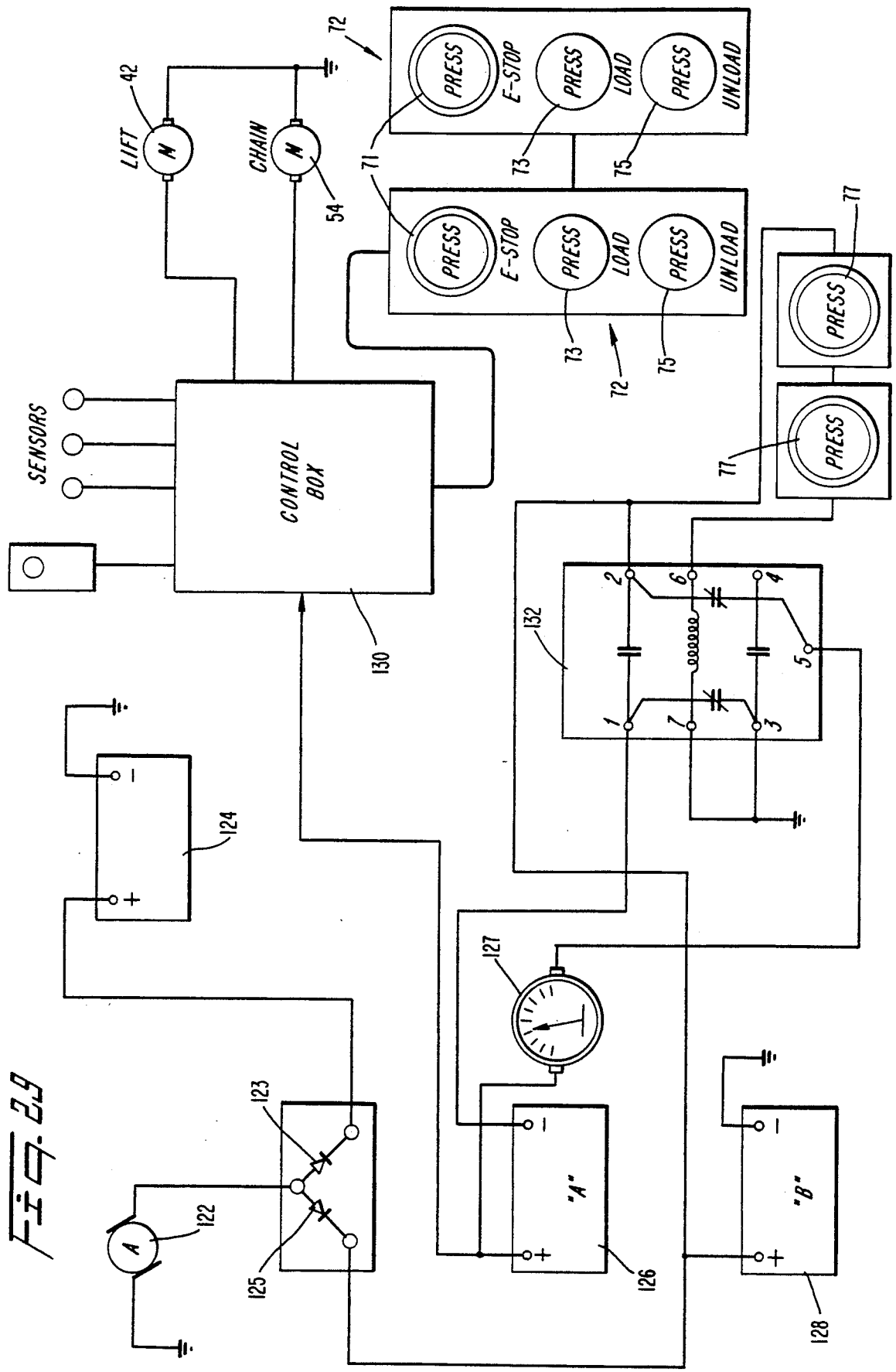

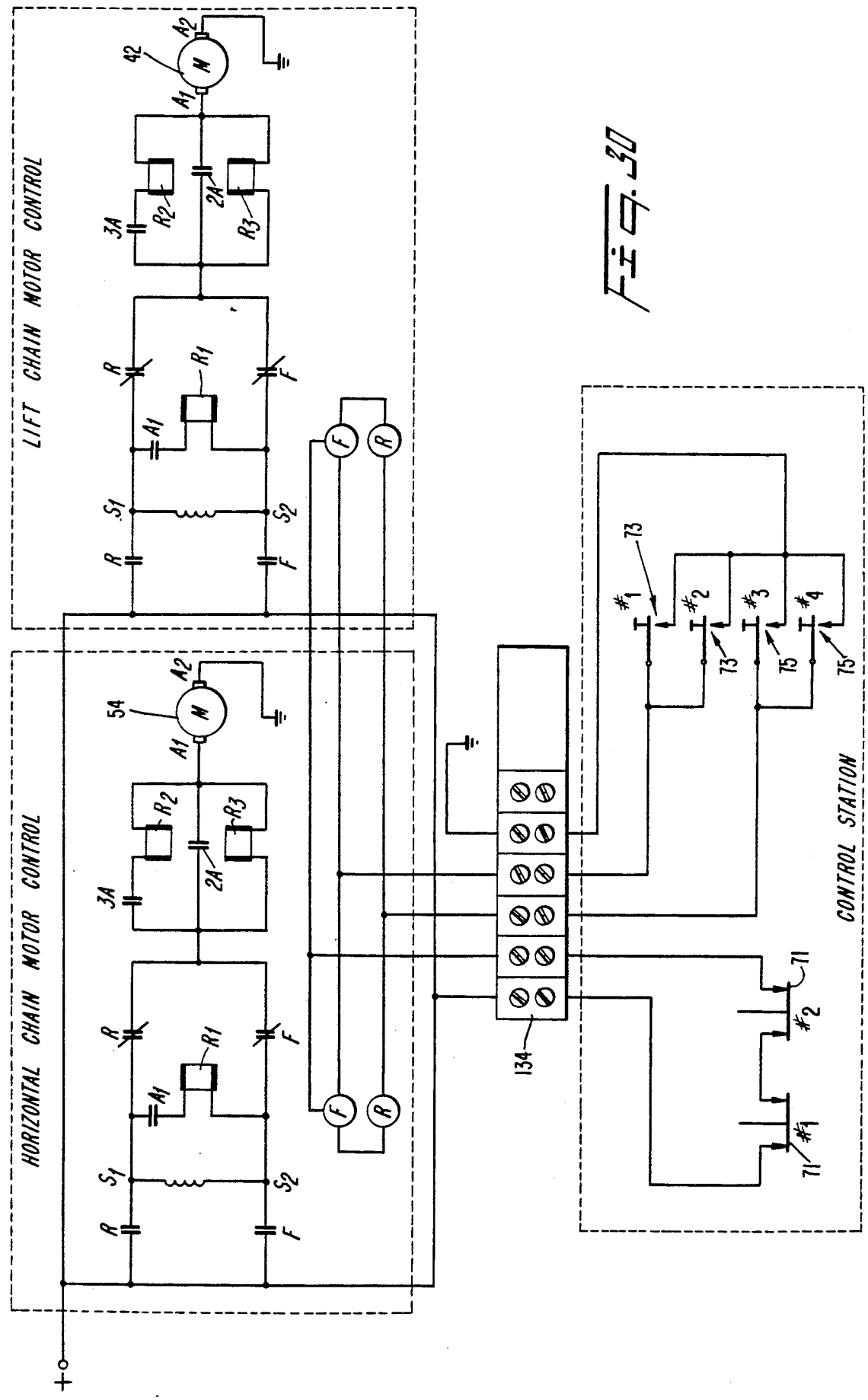

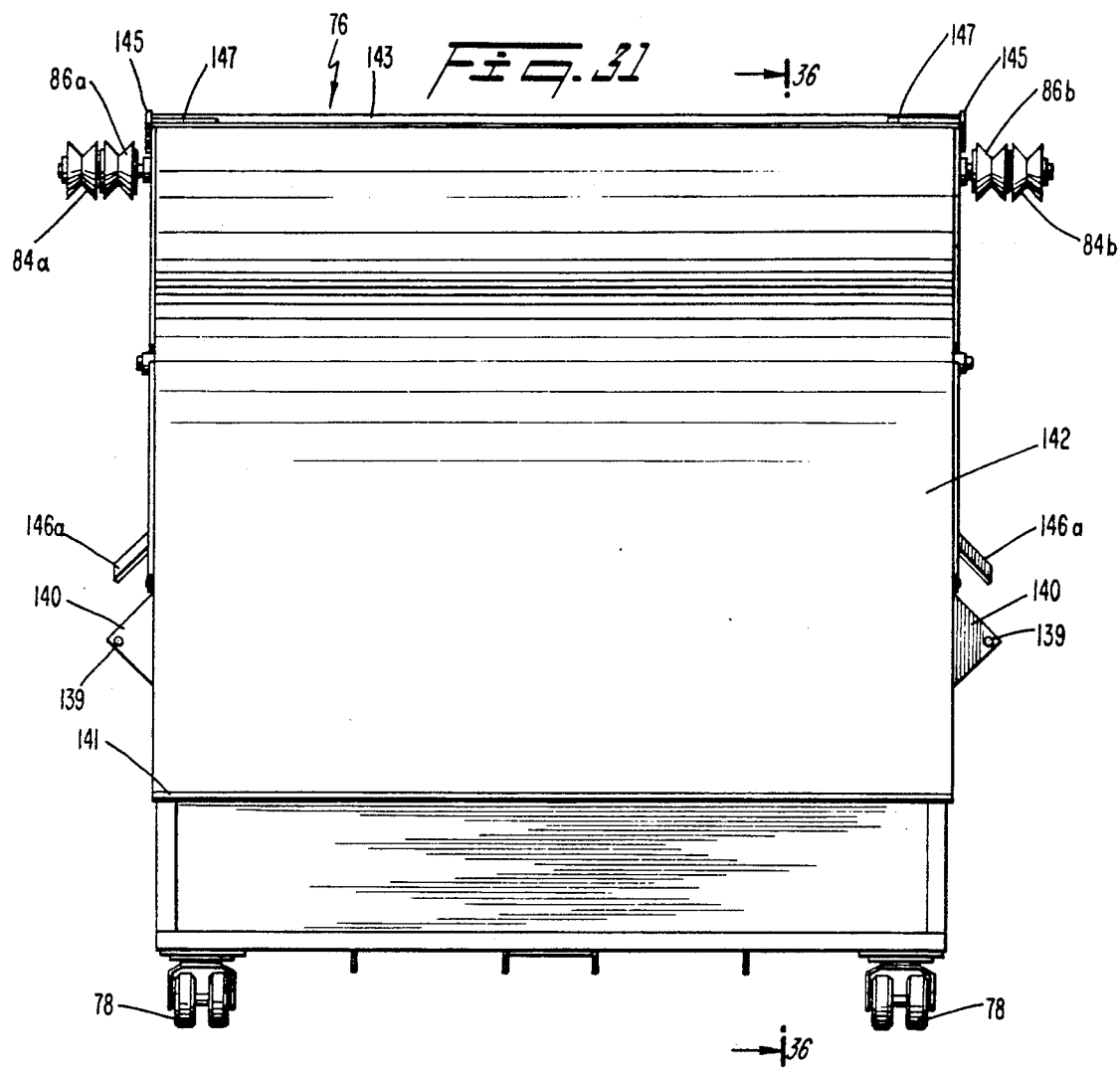
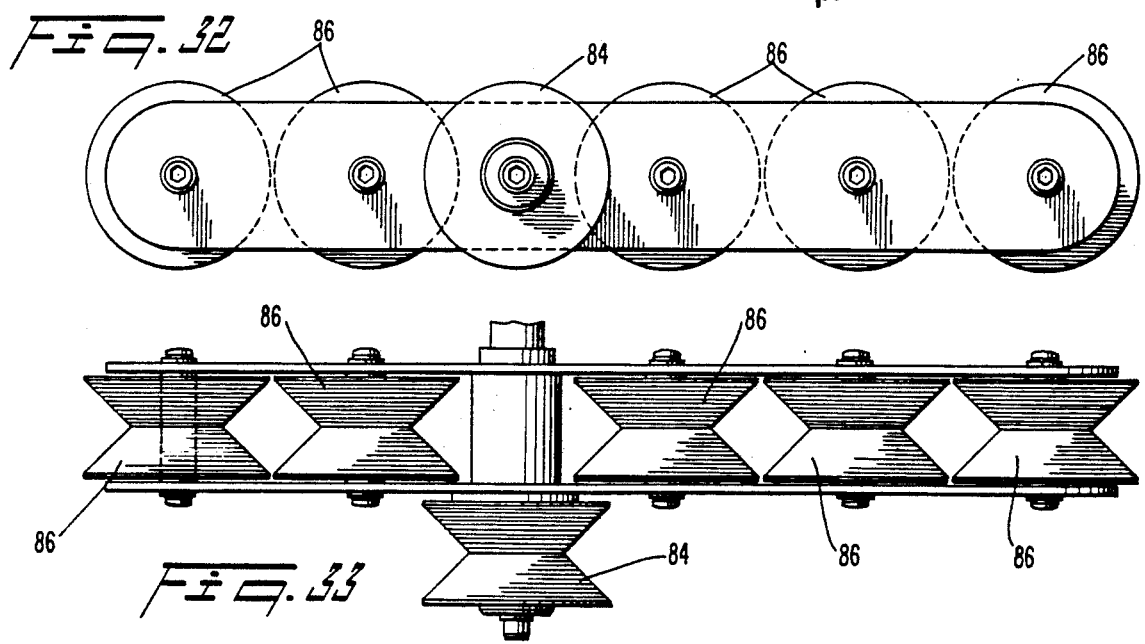

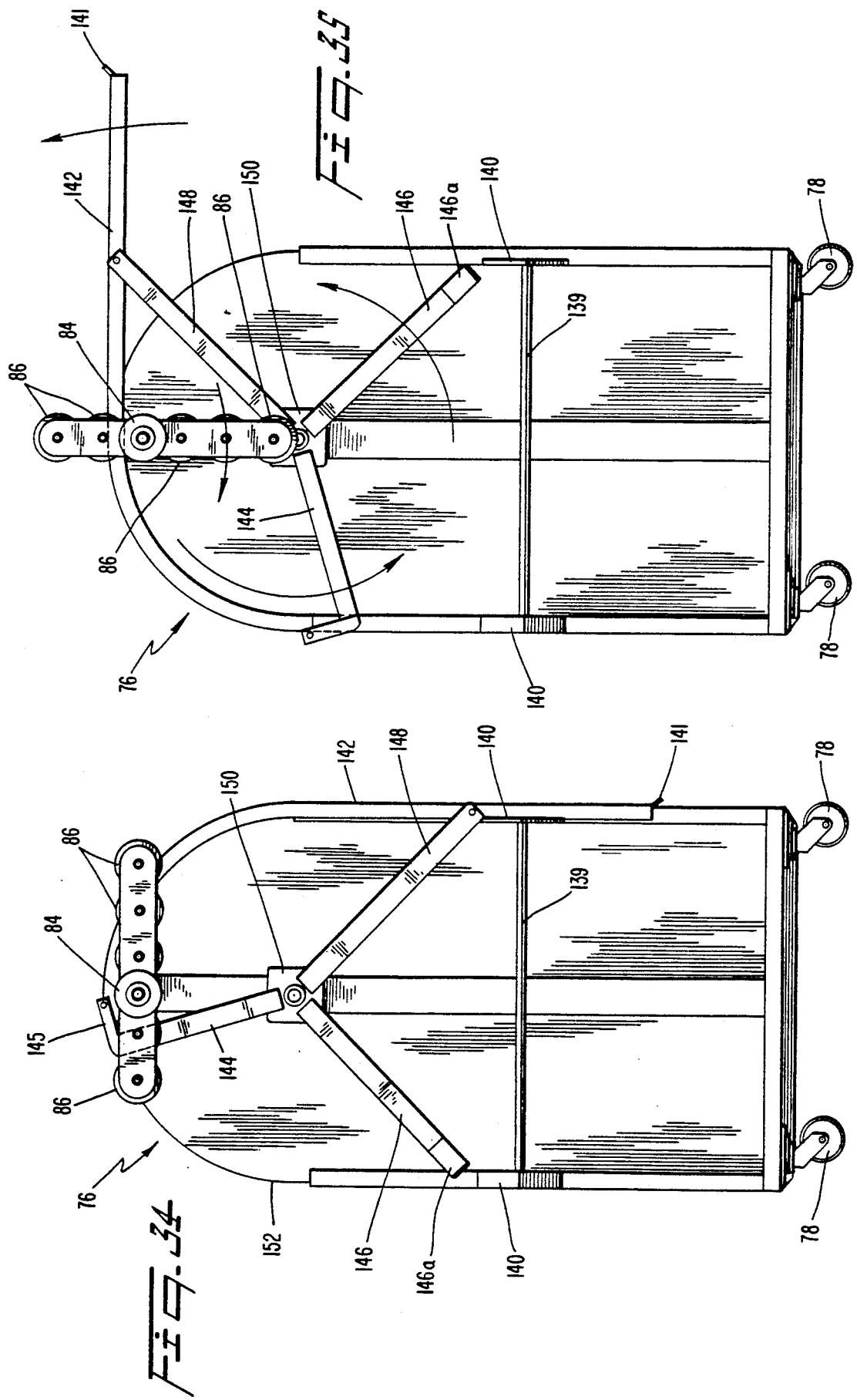

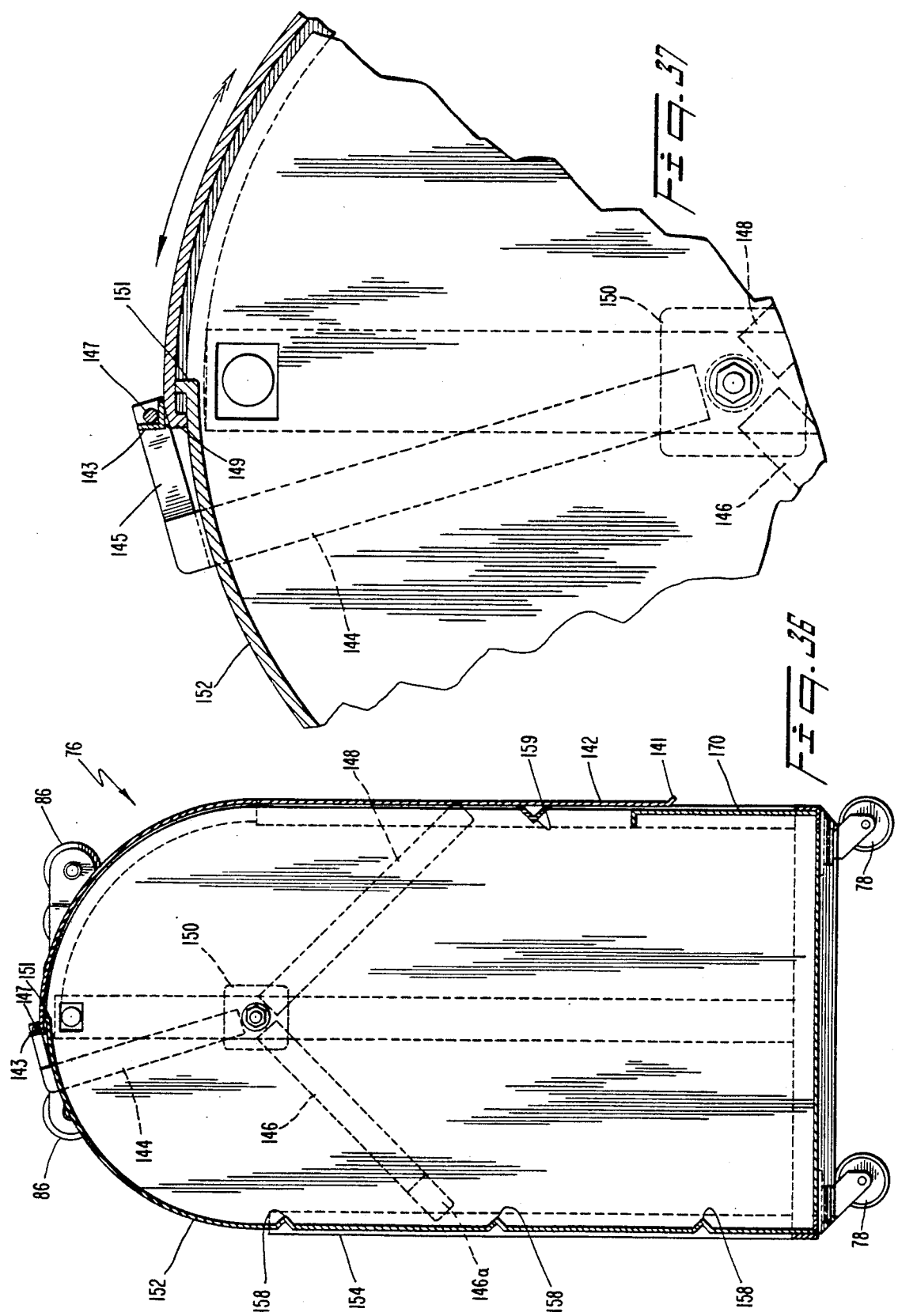

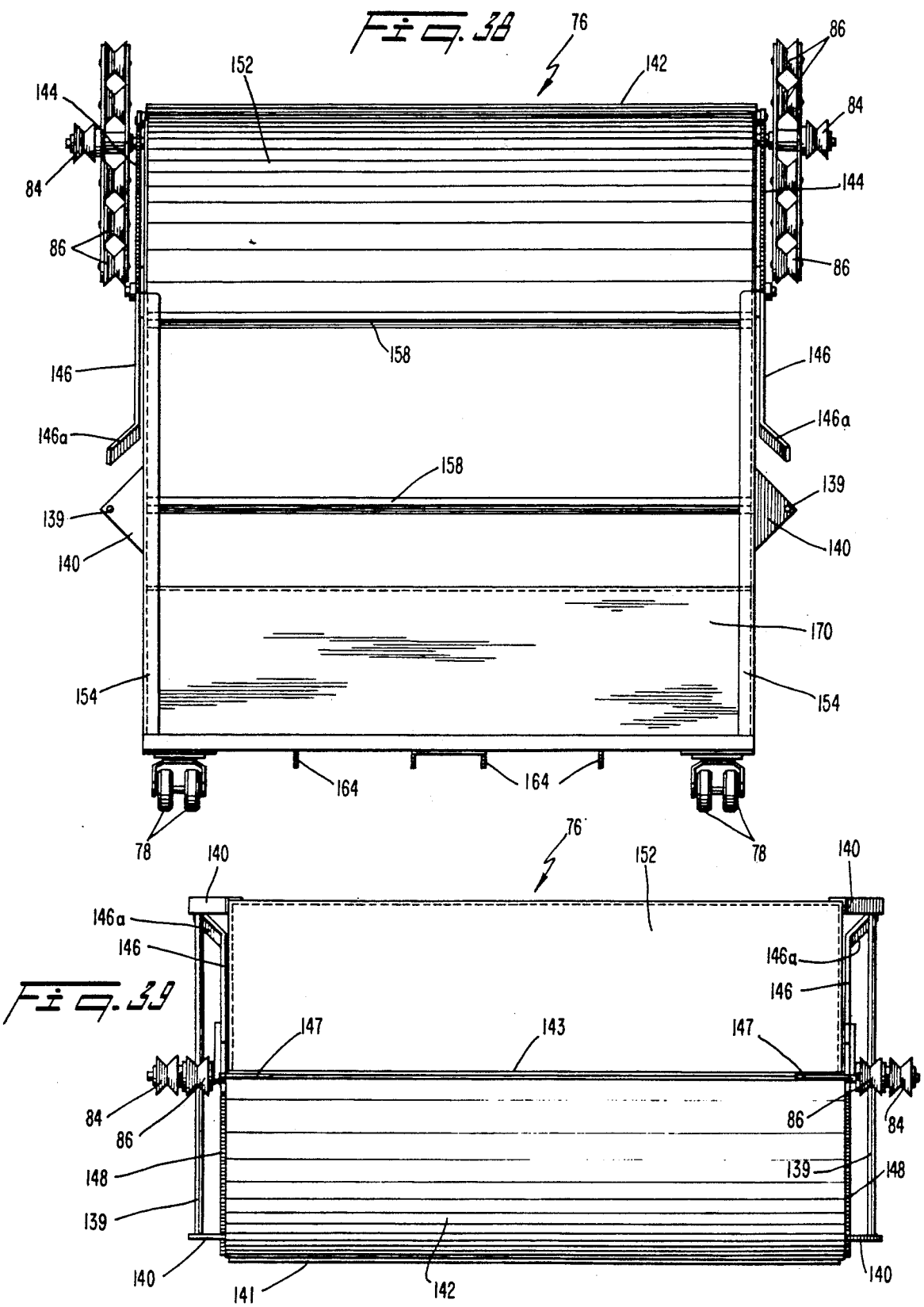

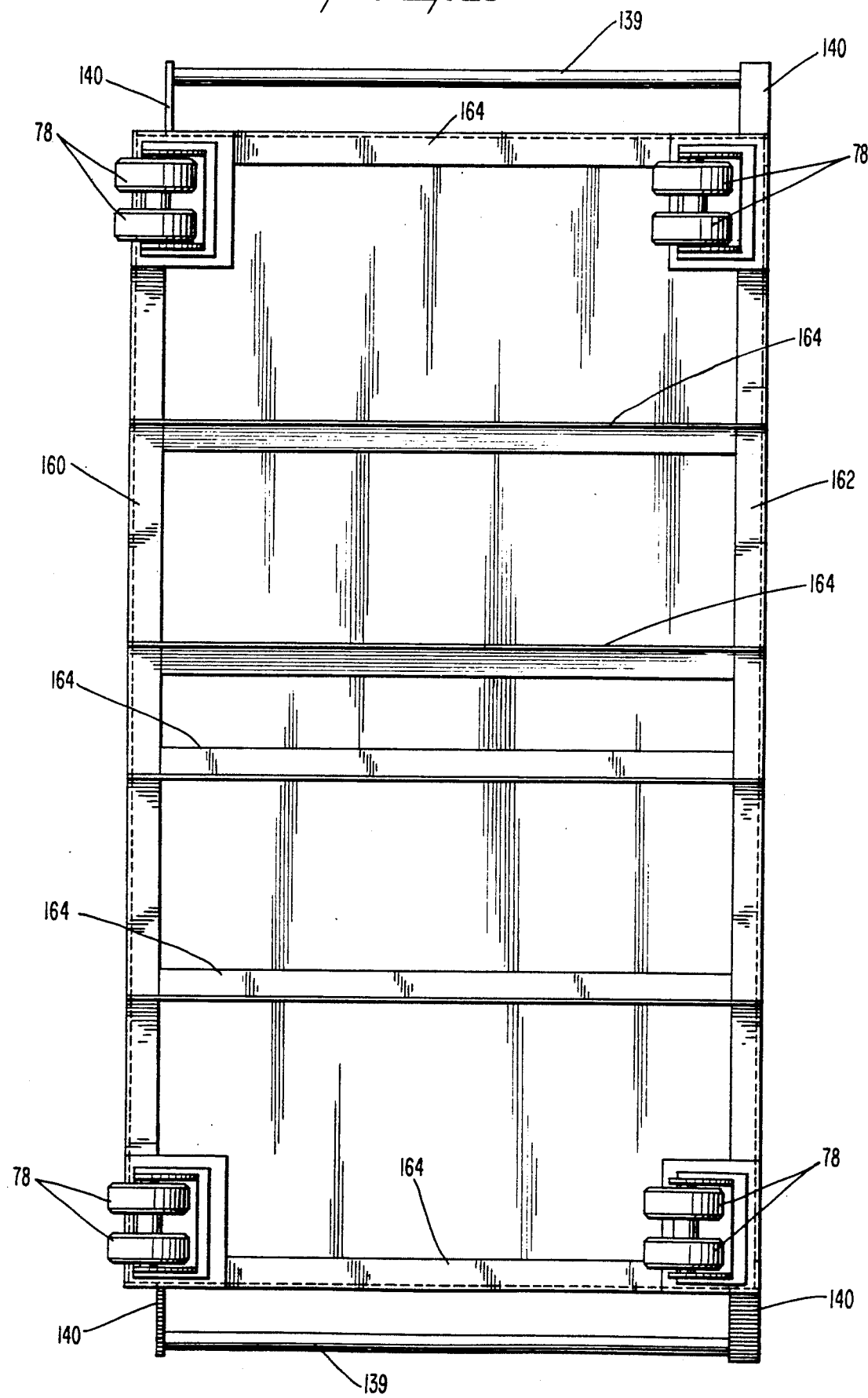

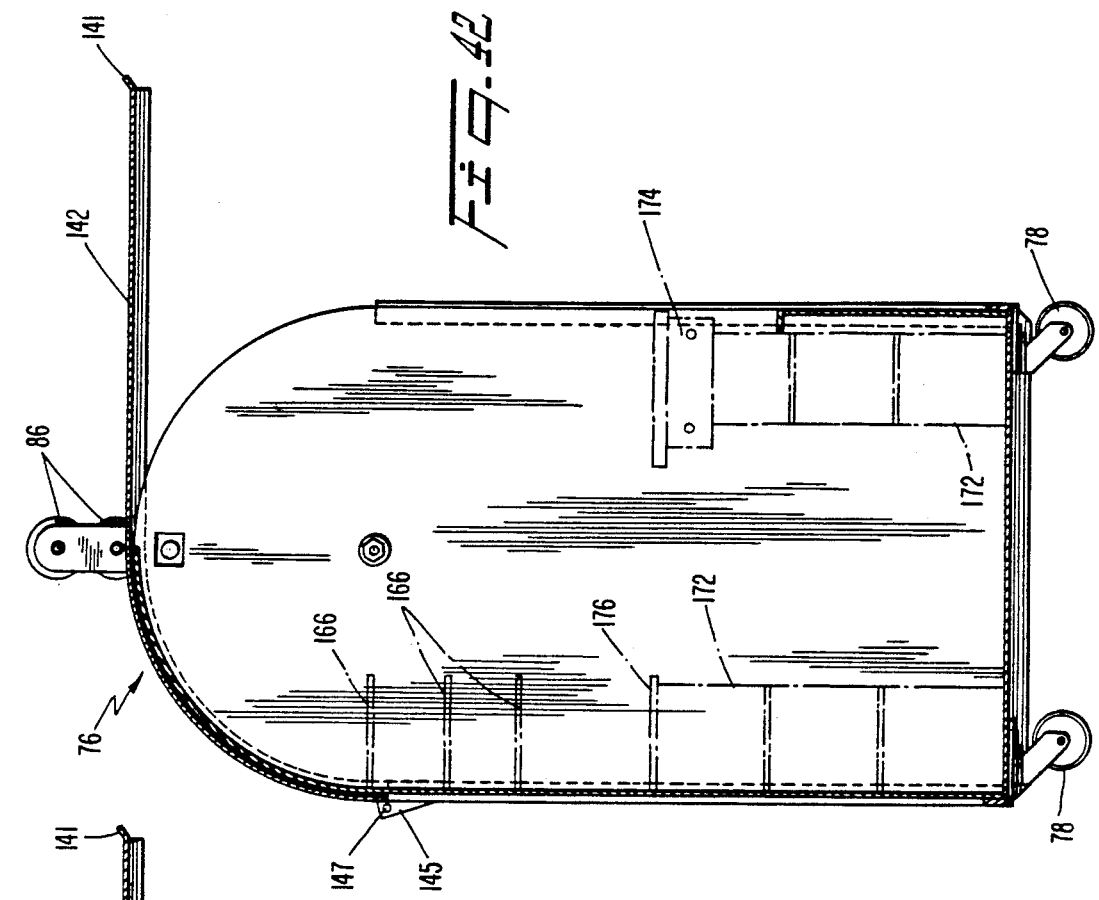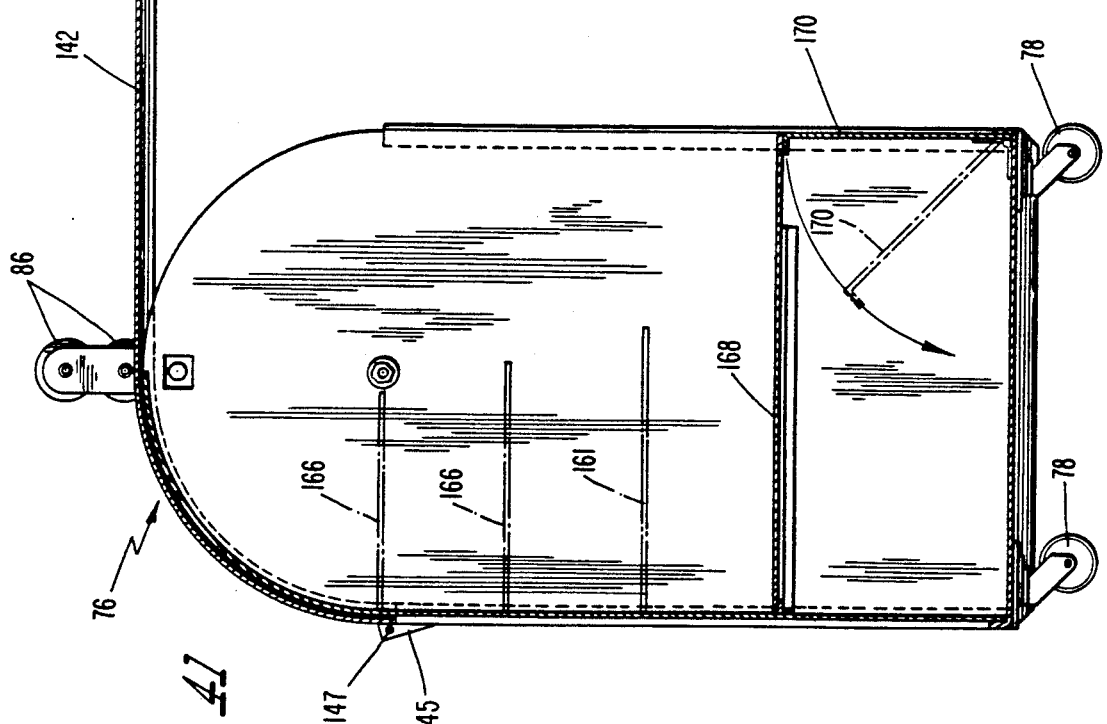

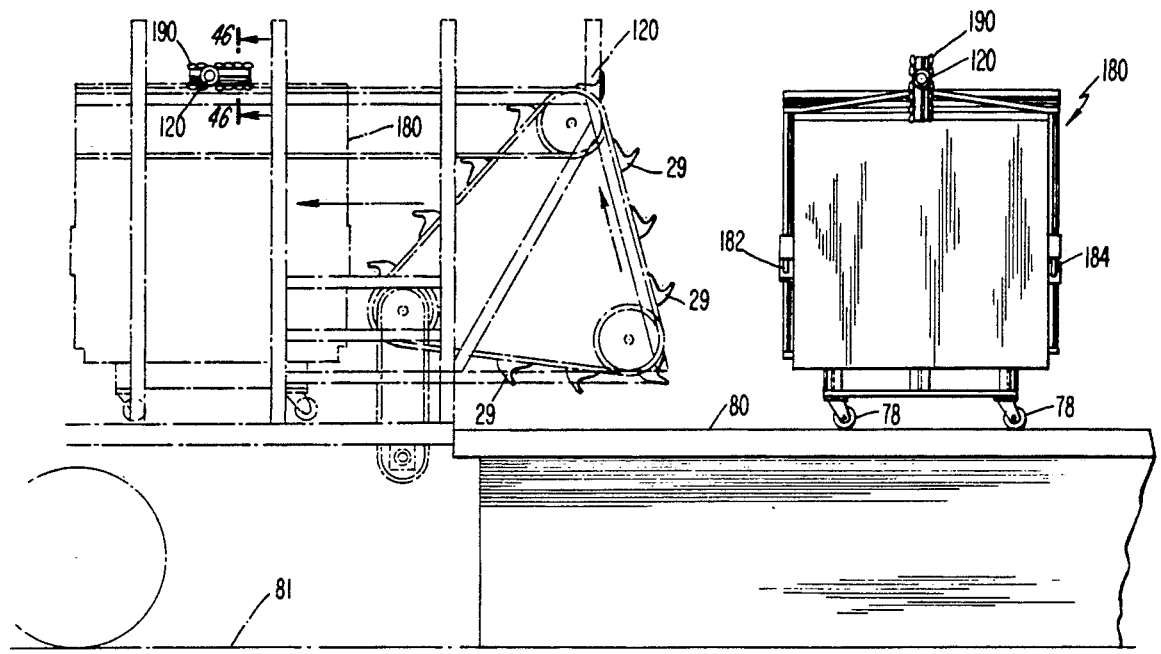
Fig. 43
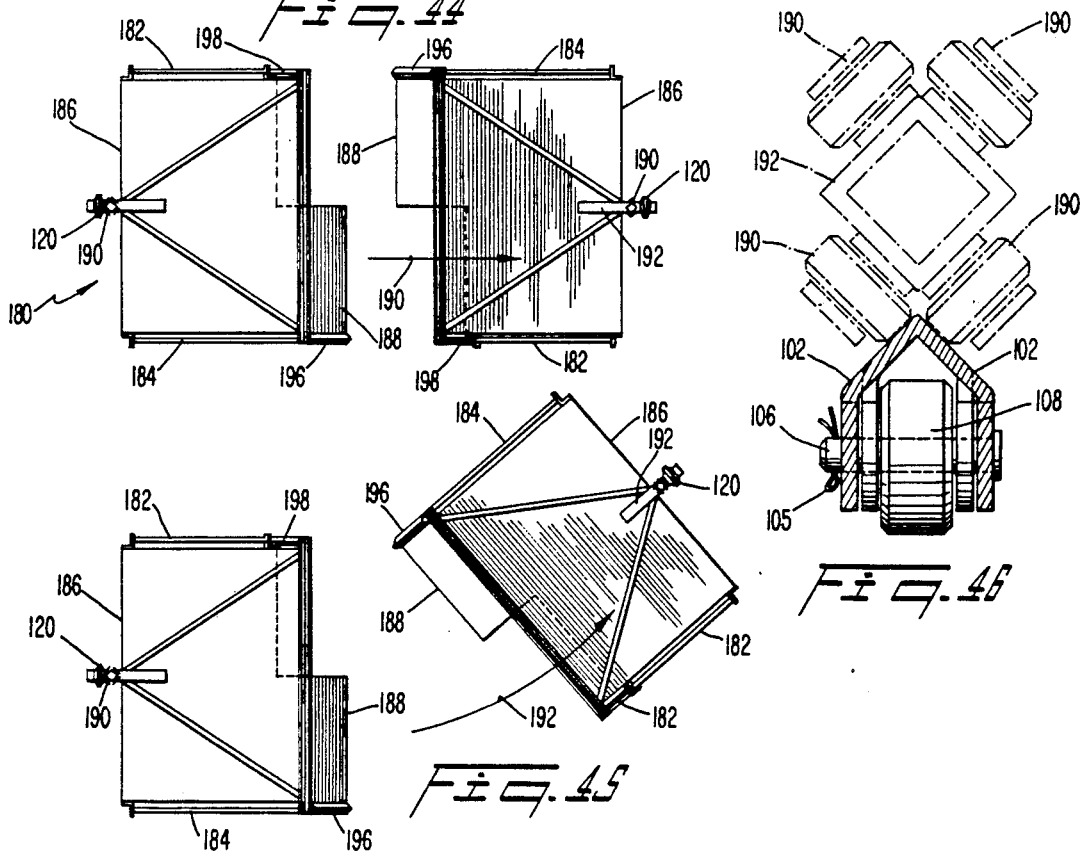
Fig. 44
Fig. 45
Fig. 46

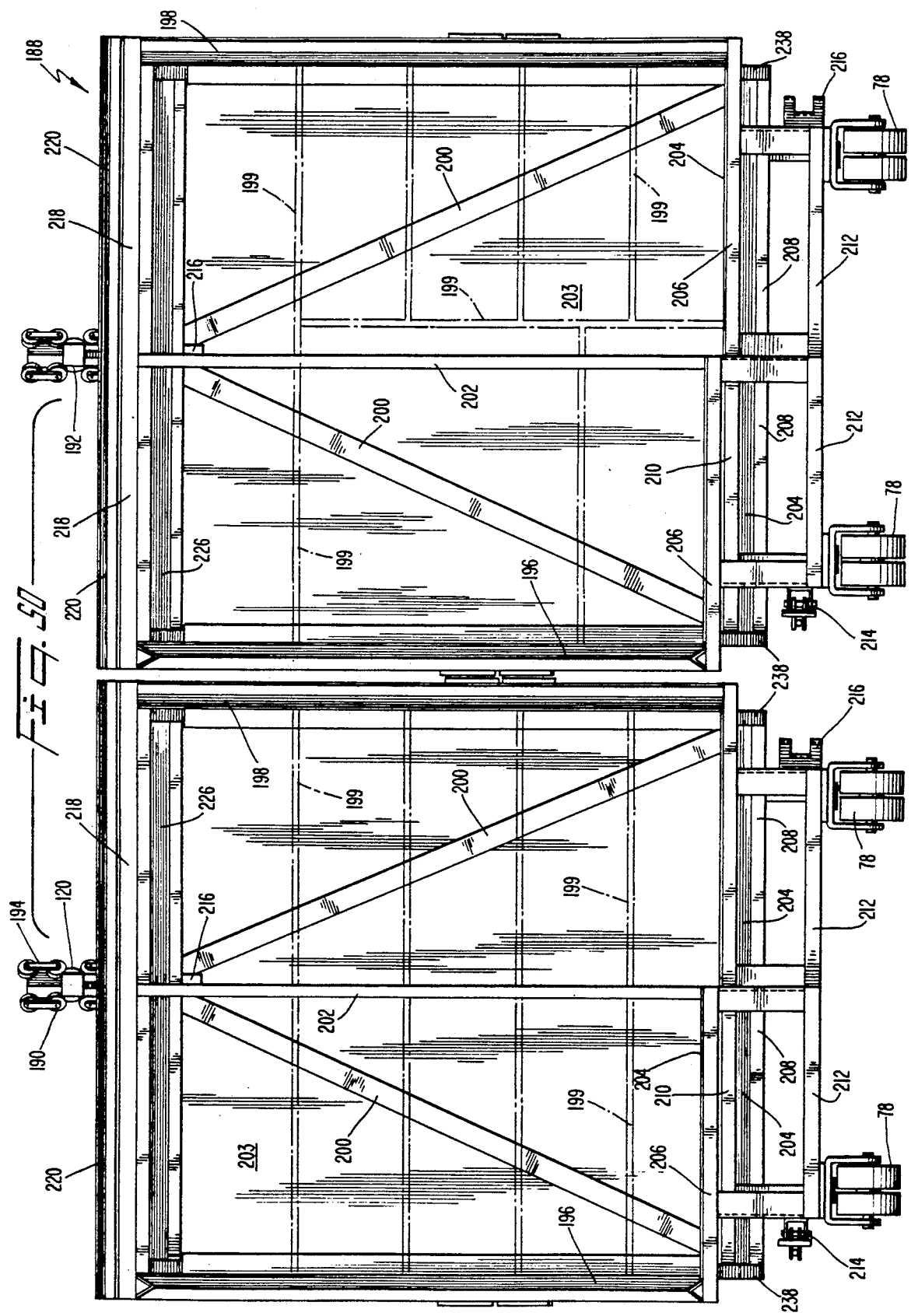

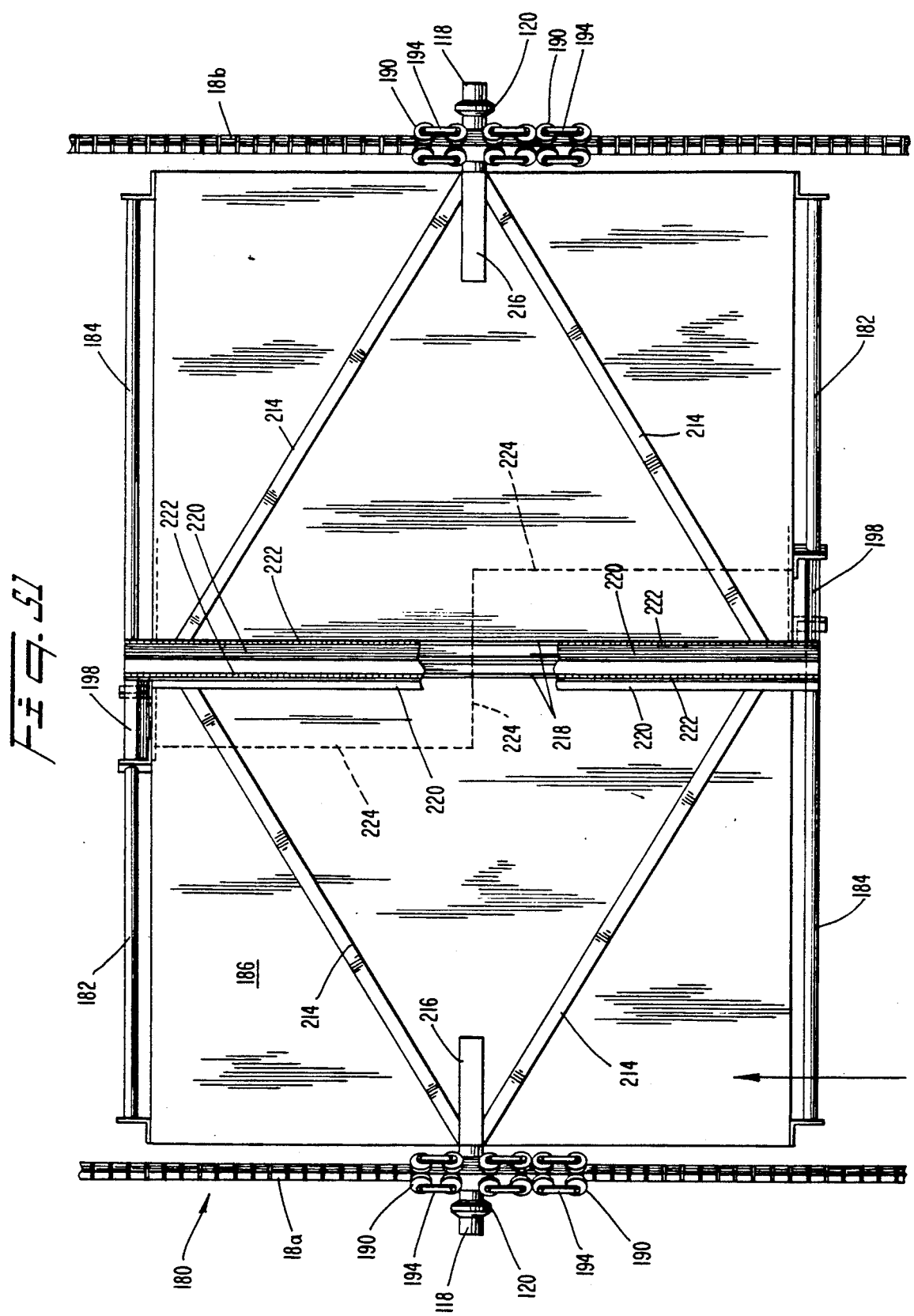

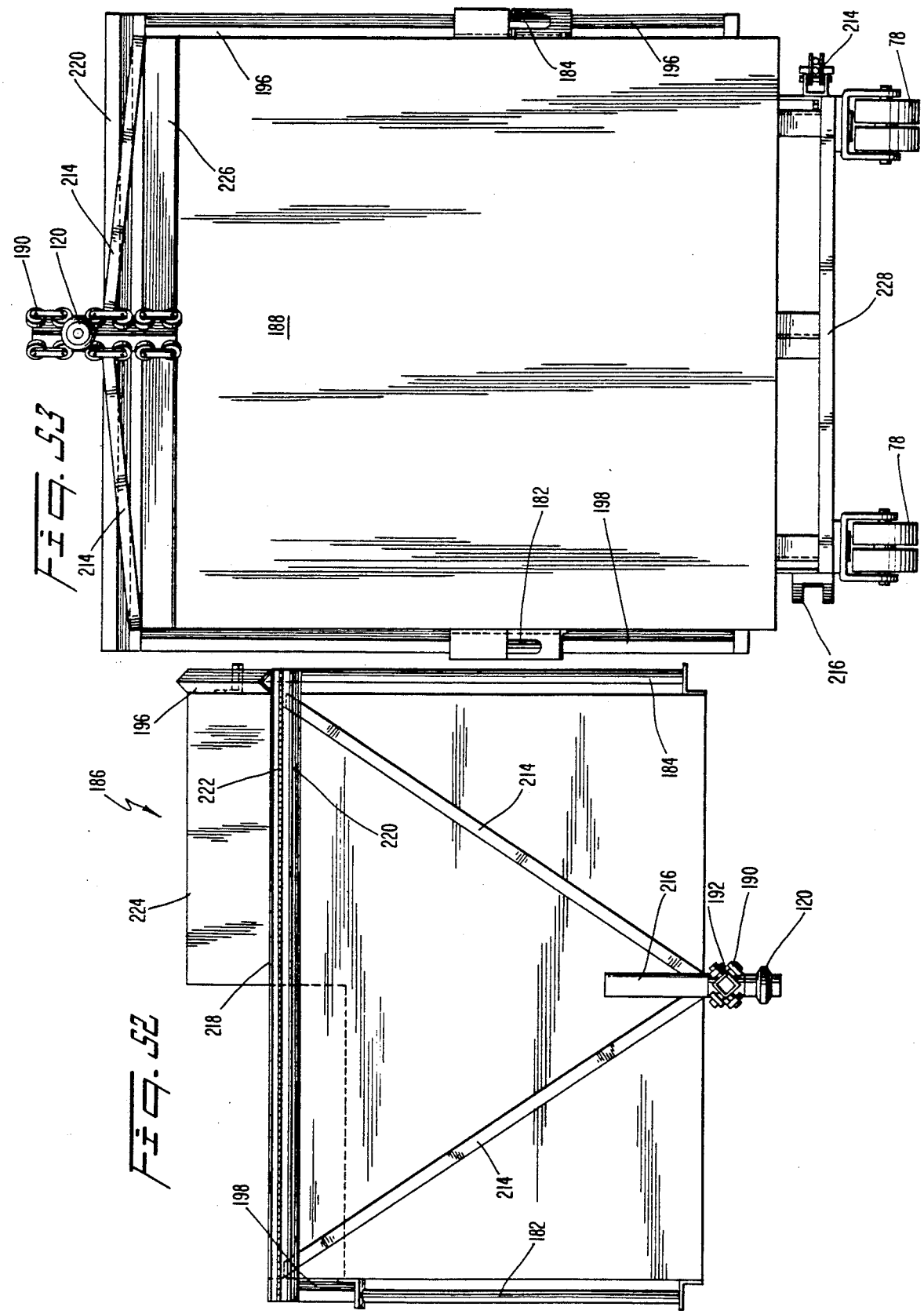

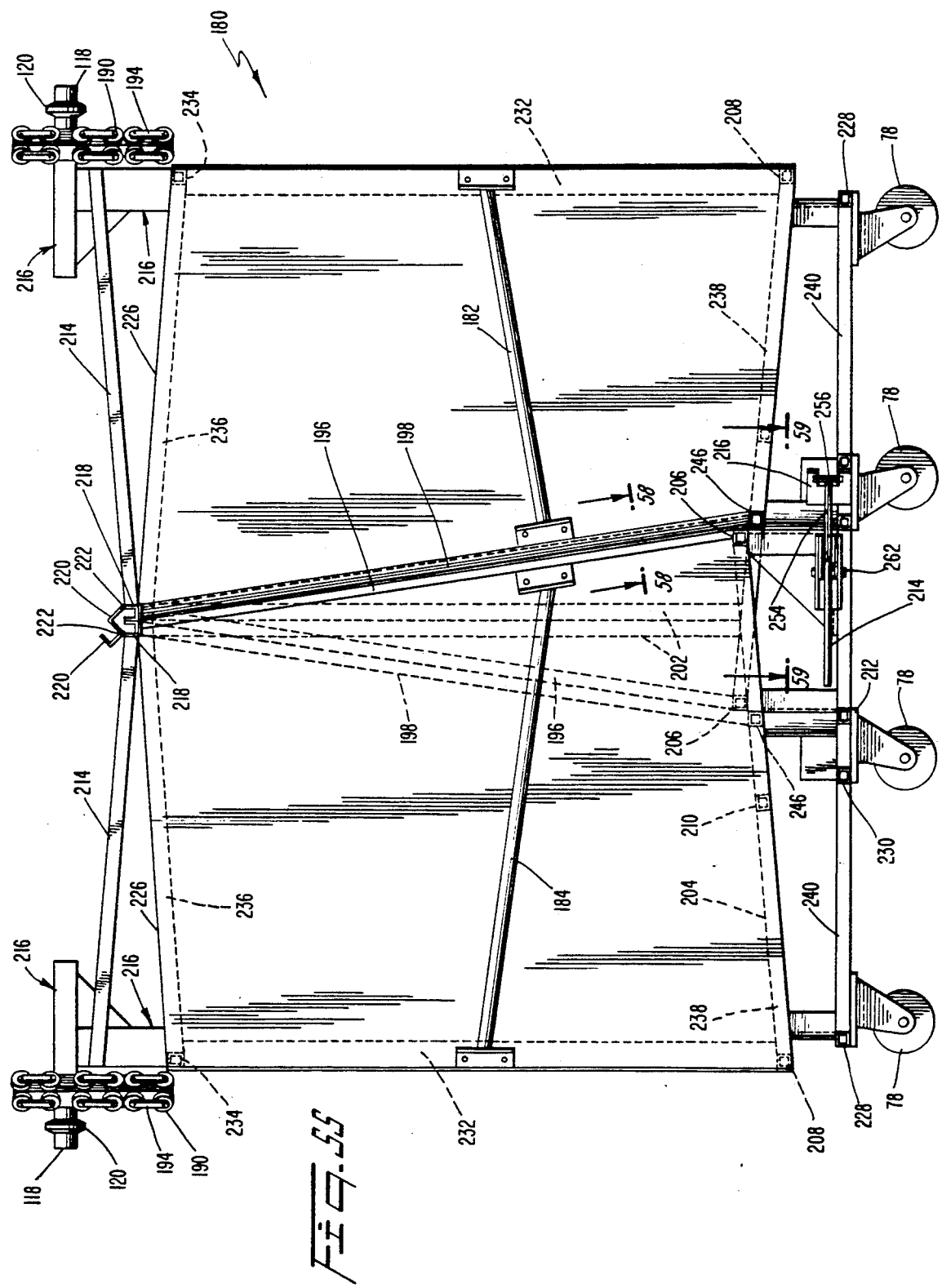

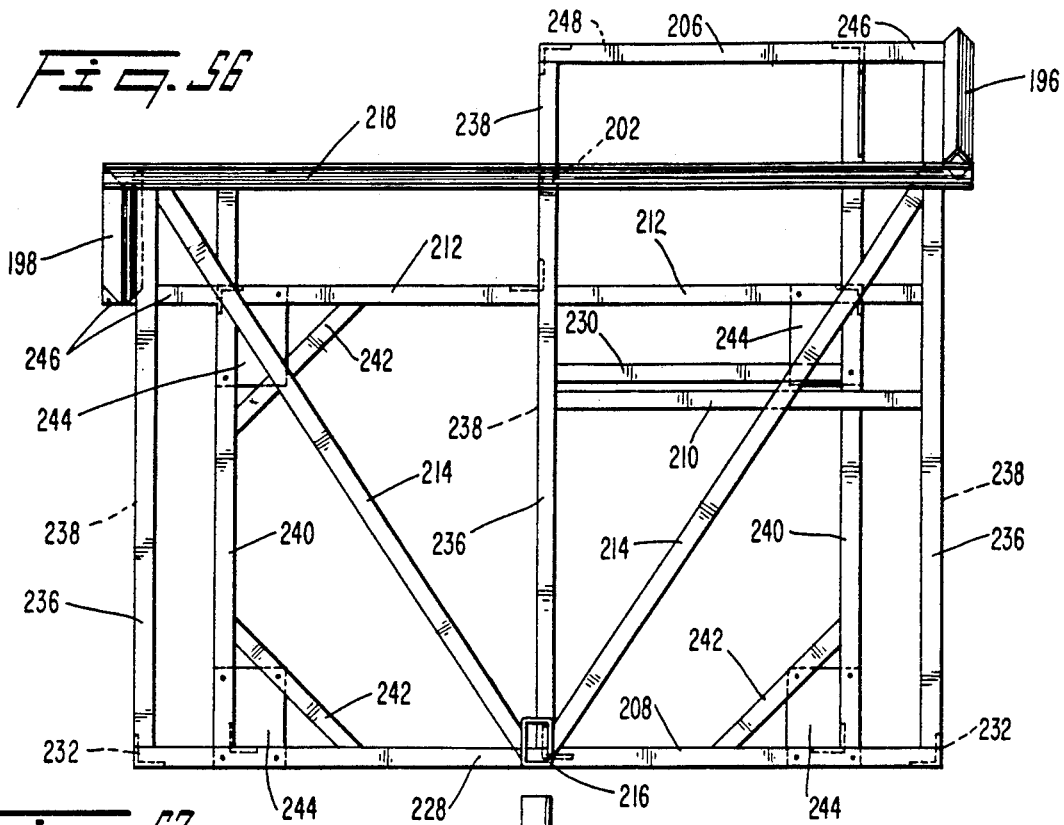
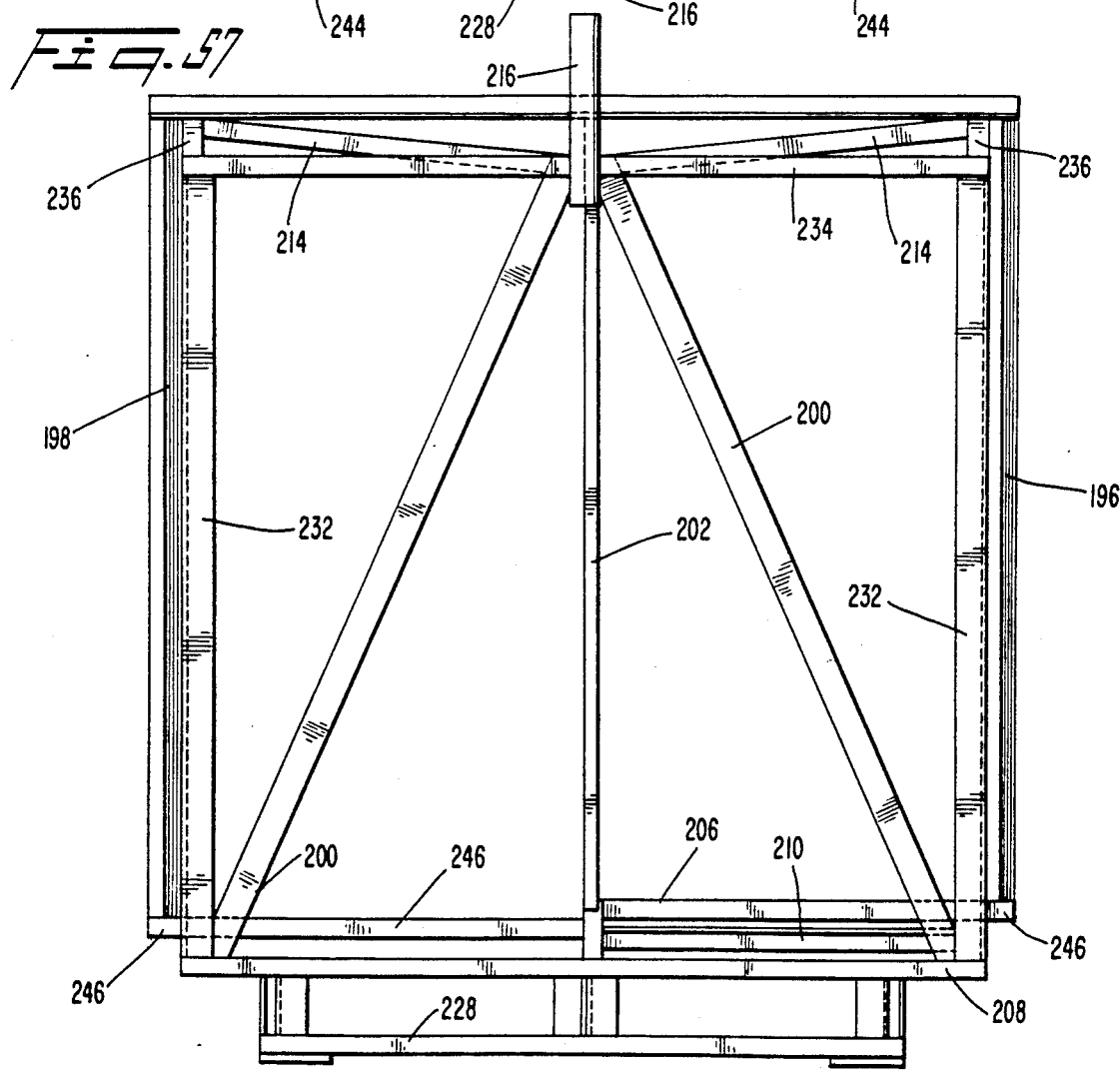

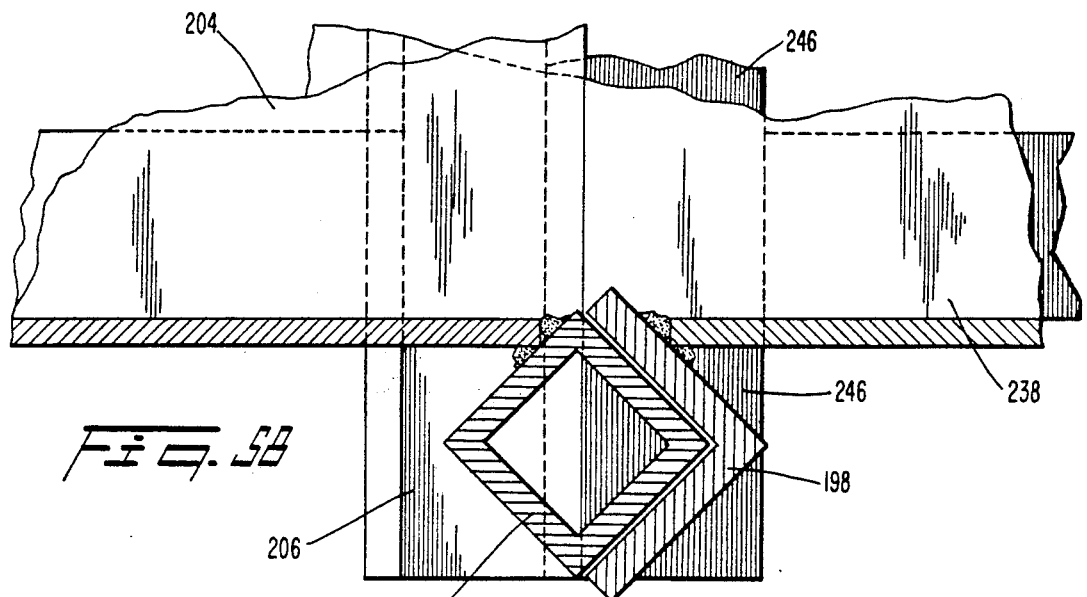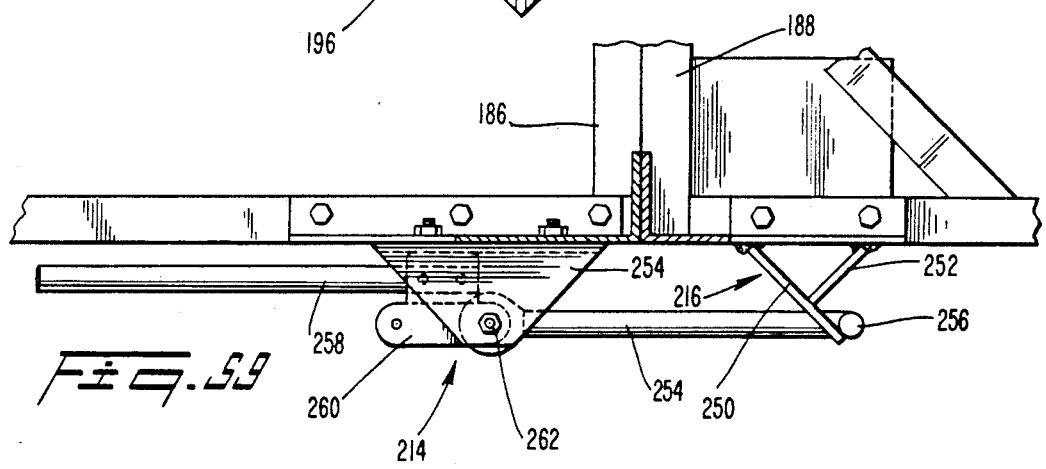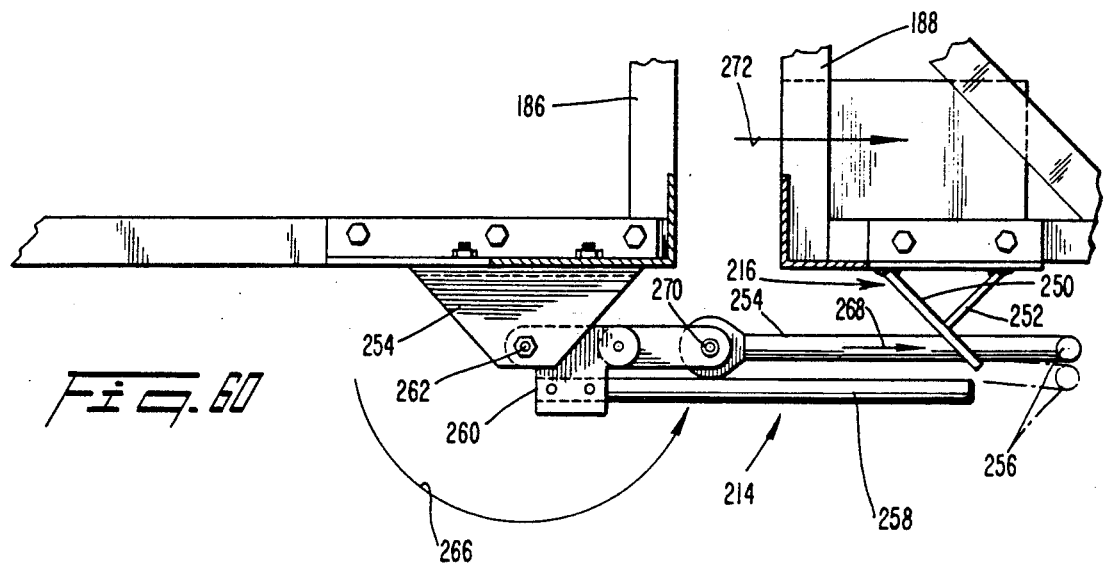

BULK CONTAINERS AND APPARATUS FOR LOADING BULK CONTAINERS ONTO A TRUCK

TECHNICAL FIELD

This invention relates, generally, to bulk containers and to a self-loading truck. More particularly, the inventive apparatus lifts containers on a loading dock or the ground onto a truck and unloads containers on a truck onto a loading dock or the ground.

BACKGROUND ART

It has long been the common practice to use laborers to load and unload trucks. For heavy loads, mechanical devices such as cranes have long been used.

Due to the high cost and low efficiency of manual labor, several inventors have made efforts to provide self-loading trucks. Typically, self-loading trucks include vertical lifting chains to lift items from the ground or from a loading dock, and horizontal chains that carry the lifted objects onto the truck.

For example, Leroux U.S. Pat. No. 4,642,018 discloses a vertical lifting chain and a horizontal trolley chain for automatically loading a transport truck by means of suitable control means and motors that are built into the truck body.

Other U.S. Pat. Nos. showing self-loading trucks are 2,442,549 to Pearlman, 2,873,869 to Neaverson, 3,109,544 to Learmont and 2,211,721 to Gerosa. Moreover, German patent 1121550 also shows a structure of interest.

DISCLOSURE OF INVENTION

A conventional truck having an elongate bed is modified by adding two major items: a means for lifting containers from a first support surface such as a loading dock to a position at the rearward end of a truck bed, and a means for carrying the containers from the rearward end of the truck bed to the forward end thereof to make room for additional containers.

The lifting means is motor driven and includes a plurality of pairs of laterally spaced, rearwardly extending hook members carried by chain members disposed on opposite sides of the truck bed. The chains form a continuous loop and rotate in a vertical plane; the hook members are secured to their associated chains at equidistantly spaced intervals along the extent of each chain. The chains follow a path of travel determined by sprocket gears; in a preferred embodiment, the gears are arrayed in a triangular configuration. Thus, a preselected individual hook follows a triangular path of travel from a first downward and rearward position, to a second elevated position, to a downward and forward third position, and thence back to its first position. The elevated second position is forward and above the first position and is above and rearward of the third, i.e., it is at the apex of the triangular path of travel.

The container members of this invention are also novel. Each container has inner and outer roller members on both its opposite sides. When the containers are properly positioned on a loading dock or on the ground, the outermost roller members are engagable by the rotating hook members.

The containers are mounted on caster wheels or other suitable wheel means to allow their manual orientation on the loading dock or ground preparatory to activation of the motor means which drives the sprocket gears and hence the hook-carrying chain members. The outer roller members of a container to be lifted onto the truck are positioned such that they are engaged and lifted by the hook members as the hook members travel from their first, lowermost and rearwardmost position, to their second, elevated position. The hook members disengage from the outer roller members when the hook members reach the second position, i.e., at the highest point of the triangular path of travel of the hook-carrying chains.

A pair of elongate, horizontally disposed track members are rotatably mounted in vertical planes on opposite sides of the truck bed at the same elevation as the sprocket gears that are positioned at the apex of the triangular array of sprocket gears. Each track member forms a continuous loop that includes a top section that extends from a rearwardmost position contiguous to the uppermost gear member in the lift hook assembly to a forwardmost position near the forward end of the truck bed, and a bottom section of the same extent parallel to the top section that defines the return path of travel for the continuous loop. Sprocket gears at opposite ends of each track member loop are rotated by suitable motor means and serve to drive the track members along their respective paths of travel when the novel apparatus is in use.

Thus, as the lift hook members attain their respective uppermost positions, and begin to disengage from the outer roller members of a container being lifted, the inner roller members of the container are deposited atop their associated horizontal track member. The rotation of the horizontal track members serves to carry each container toward the forward end of the truck bed.

The vertical dimension of each container member is predetermined so that when the inner roller members thereof are supported by the track members, the caster wheels at the bottom thereof are spaced vertically upward above the truck bed, i.e., the container members are held suspended above the truck bed.

The inner roller members are formed to interfit with the track members so that they do not slip therefrom. Specifically, the inner roller members of each container have an annular "V" shaped concavity formed therein about the periphery thereof, and each horizontal track member has an inverted "V" convexity along its extent. Thus, when the inner rollers are in engagement with the moving horizontal track members, and the track members are carrying the container members forwardly relative to the truck bed, the containers cannot slip from the tracks. Moreover, there is no relative rotation between the inner rollers and their associated track member as the container is being carried forwardly. However, when the first container member to be loaded has achieved its forwardmost position on the truck bed, the forward transverse wall of the truck bed will bar further travel of the container. Since the horizontal track will continue to follow its looped path of travel as additional containers are delivered thereto by the hook members, the inner rollers of each container will begin to rotate when the forward progress thereof is impeded so that no appreciable frictional load is presented to the continued rotation of the horizontal track members. Thus, when a second container member encounters the previously-loaded first container and is barred by the first container from further forward travel, its roller members will begin to rotate at a speed determined by the speed of the track members and so on until the truck is fully loaded.

A first embodiment of the container is of generally parallelepiped construction and is a unitary structure.

A second embodiment of the container has the same box-like appearance when assembled, but is constructed of two separate parts that form a unitary structure only when brought together.

More specifically, each part has an "L" shape when seen in plan view; when properly interlocked, the two "L" shaped parts fit together and collectively form a box-like unitary structure. Moreover, each part has an open front to provide easy access thereinto. Advantageously, when the parts are placed in juxtaposition with one another to form a unitary structure, the open fronts confront one another and the interior of the structure becomes inaccessible.

The primary object of this invention is to provide novel bulk containers that are liftable from a support surface onto a truck and vice versa in a semi-automatic manner.

A more general object is to disclose apparatus for modifying a conventional truck into a semi-automatic self-loading device.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 1 is side elevational view of the novel truck of this invention;

FIG. 2 is a plan view of the apparatus of FIG. 1;

FIG. 3 is a detailed side elevational view of part of the apparatus of FIG. 1;

FIG. 4 is a side elevational view of the lift hooks and chain that carries said lift hooks;

FIG. 5 is a front elevational view of the structure shown in FIG. 4;

FIG. 10 is a side elevational view showing the fifth step in said animation;

FIG. 11 is a side elevational view of the sixth step in said animation;

FIG. 12 is a back elevational view taken along line 12—12 in FIG. 1;

FIG. 13 is a detailed view of a segment of the horizontal chain of this invention;

FIG. 14 is a sectional view taken along line 14—14 in FIG. 13;

FIG. 15 is a side elevational view of a first embodiment of a link in the horizontal chain;

FIG. 16 is a side elevational view of the chain link shown in FIG. 15;

FIG. 17 is a side elevational view of a second embodiment of a chain link;

FIG. 18 is an end view of the chain link shown in FIG. 17;

FIG. 19 is an end view of a chain link of a second embodiment of the novel chain;

FIG. 20 is a side elevational view of a link in the chain of the second embodiment;

FIG. 21 is an end view showing the two parts of the second embodiment of the chain;

FIG. 22 is an end view showing an assembled second embodiment of the chain;

FIG. 23 is a sectional view taken along line 23—23 in FIG. 1;

FIG. 24 is a detailed side elevational view of the upper most sprocket member area in the triangular array of lifting hooks;

FIG. 25 is a detailed end elevational view of the roller members and chains associated with each container member;

FIG. 26 is a detailed view of a second embodiment of the lift hook of this invention;

FIG. 27 is a top plan view of the apparatus of FIG. 26;

FIG. 27A is an elevational view of the roller means used in connection with the second embodiment of the hook of this invention;

FIG. 28 is a side elevational view of a hook member of a second embodiment;

FIG. 29 is a wiring diagram of the control means for this invention;

FIG. 30 is a wiring diagram of the control box means of this invention;

FIG. 31 is a front elevational view of a first embodiment of the container;

FIG. 32 is a detailed side elevational view of the roller members associated with each container;

FIG. 33 is a top plan view of the roller assembly shown in FIG. 32;

FIG. 34 is a side elevational view of the first embodiment of the container, showing its lid in a closed configuration;

FIG. 35 is a side elevational view of the container of FIG. 34 with its lid in its open configuration;

FIG. 36 is a sectional view taken along line 36—36 in FIG. 31;

FIG. 37 is a detailed view of some of the parts shown in FIG. 36;

FIG. 38 is a front elevational view of the first embodiment of the container with its lid open;

FIG. 39 is a top plan view of the apparatus shown in FIG. 38;

FIG. 40 is a plan view of the frame of the container;

FIG. 41 is a side elevational view of the container modified to provide a mobile store;

FIG. 42 is a side elevational view of the container modified to provide a hot dog stand;

FIG. 43 is a side elevational view of a second embodiment of the novel container on a loading dock;

FIG. 44 is a top plan view of the two identical parts that when latched together form a unitary structure;

FIG. 45 is a top plan view of the parts shown in FIG. 44, which view is intended to indicate the maneuverability of each part of the novel structure;

FIG. 46 is a front elevational view of a link in the horizontal load chain associated with the novel truck and a view in phantom lines of the novel roller assembly employed with the container of the second embodiment;

FIG. 50 is a front elevational view of the two parts of the second embodiment container disposed in lateral relation to one another, with their front or open sides facing the viewer;

FIG. 51 is a top plan view of the container of the second embodiment when suspended over the truck bed;

FIG. 52 is a top plan view of only one part of the container of the second embodiment;

FIG. 53 is a rear elevational view of the parts shown in FIG. 52. The rear wall of the container shown in FIG. 53 becomes the side wall of the unitary structure when the two identical parts are assembled;

FIG. 55 is a side elevational view showing the two parts in their assembled configuration;

FIG. 56 is a top plan view of the frame of a container part;

FIG. 57 is a rear elevational view of the frame shown in FIG. 56;

FIG. 58 is a sectional view taken along line 58—58 in FIG. 55;

FIG. 59 is a top plan view of the latch assembly in its latched configuration; and FIG. 60 is a top plan view of the latch assembly in its unlatched configuration.

Similar reference numerals refer to similar parts throughout the several views of the drawings.

BEST MODES FOR CARRYING OUT THE INVENTION

Figure 6:
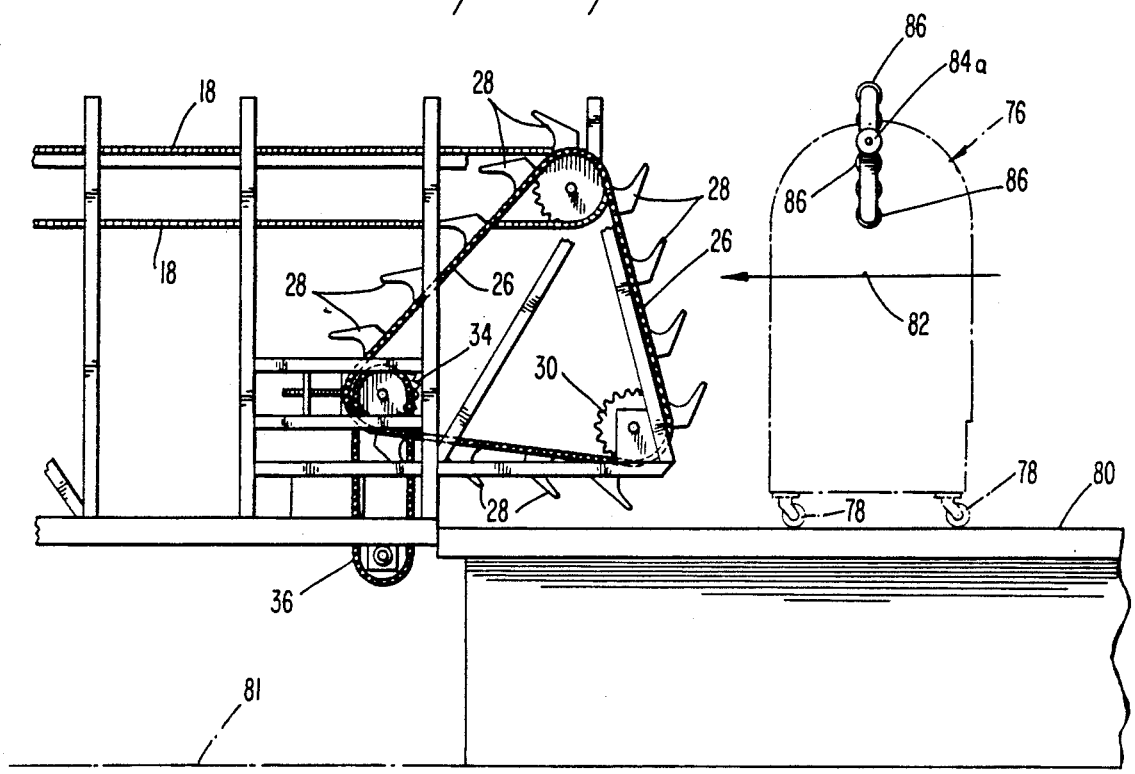
FIG. 6 is a side elevational view showing the first step in an animation of the loading and unloading procedure.

Referring now to FIG. 1, it will there by seen that an embodiment that illustrates the teachings and suggestions of this invention relating to the means for lifting and loading the novel containers is denoted by the reference numeral 10 as a whole. Apparatus 10 includes a truck cab 12 and a truck body 14 shown in phantom lines; truck body 14 may be enclosed as suggested in the drawing or may be open to the elements if desired because the novel containers are weatherproof.

The two primary elements of apparatus 10 are the lift hooks and chain assembly, generally designated 16, at the rear end of truck body 14 and the horizontal chains, generally denoted 18, that extend the length of the truck bed 14 as shown.

The lift hooks and chains 16 perform the function of lifting the novel containers onto the truck from the ground or a loading dock and the horizontal chains 18 provide a track means for carrying the lifted containers to the forward end of the truck. Conversely, horizontal chains 18 carry containers already on the truck to the lift hooks and chain assembly 16 for unloading.

As perhaps best understood in connection with FIGS. 2 and 12, there are two sets of the lift hook and chain apparatus 16 and two sets of horizontal chains 18; specifically, each of said elements is positioned adjacent an opposite side of the truck so that containers may be loaded onto the truck, i.e., a left set of lift hooks and chains 16a is disposed in laterally spaced relation to an identical, right set 16b thereof and a left horizontal chain 18a is disposed in laterally spaced relation to a right horizontal chain 18b.

Transversely disposed shaft 17 is motor driven, interconnects lift hooks 16a, 16b, and transmits power to the right set 16b of lift hooks; similarly, transversely disposed shaft 19 is motor-driven, interconnects chains 18a, 18b, and transmits power to the right horizontal chain 18b as shown in FIG. 2.

Lift hook and chain assembly 16 is driven by a motor as aforesaid through suitable speed reducing gears contained in rear motor and gear box 20; horizontal chain assembly 18 is similarly driven by a motor as aforesaid through suitable speed reducing gears contained in forward motor and gear box 22.

Batteries which provide power for rotating assemblies 16 and 18 are positioned in container 24 at the forward end of the vehicle as shown in FIG. 2.

Each lift hook and chain assembly 16 includes chain member 26 and hook members 28 secured thereto at equidistantly spaced intervals along the extent thereof. To facilitate this description, the laterally spaced counterpart of the assembly will not always be mentioned.

Chain 26 follows a triangular path of travel as shown in FIG. 1; sprocket gears 30, 32 and 34 mesh with chain 26; chain 26 is driven by chain 36 which in turn is driven by drive chain 38. As perhaps best shown in FIG. 12, sprocket 40 is rotatably mounted to power take-off shaft 41 that extends from gear and motor box 20; said box 20 includes motor 42 and chain 44 that rotates gear 46 which ultimately effects rotation of gear 40. Idler gear 48 is adjustably mounted as perhaps best shown in FIG. 3 to adjust the slack in chain 36.

Those skilled in the art of machine design will thus understand that hooks 28 will rotate in a counterclockwise direction when output shaft 43 (FIG. 12) of motor 42 is rotated in a first direction and in a clockwise direction when said output shaft is rotated in an opposite direction. The former rotation effects lifting of containers onto the truck and the latter rotation effects unloading of the containers from the truck.

A similar arrangement, best shown in FIGS. 1, 2 and 23–25, is used to effect rotation of horizontal chain 18. (Again, reference to counterpart chains 18a, 18b and the other counterpart elements should be understood). The forward end of chain 18 wraps around forward sprocket gear 50 and the rearward end of chain 18 wraps around rear sprocket gear 52. Motor 54 (FIG. 23) drives chain 56 that ultimately drives chain 58; chain 58 passes over idler gears 60, 61 and wraps around sprocket gear 62. Thus, chain 58 and hence horizontal chains 18a, 18b are rotatable in a clockwise or counterclockwise direction dependent upon the direction of rotation of shaft 50 of motor 54.

At the right side of FIG. 1, the reference numerals 64, 66, 68 and 70 represent various sensor means and the reference numerals 72, 74 denote identical sets of control buttons, generally. Buttons 72 are used when an operator is standing on the truck bed and buttons 74 are used when the operator is standing on the ground; a detailed description of these parts appears hereinafter.

FIG. 3 depicts some of the above-mentioned parts in greater detail and requires no further elaboration.

FIG. 4 shows how hook members 28 are secured to lift chain 26 and FIG. 5 is an end view of the FIG. 4 assembly. It should be understood that the teeth of sprocket gears 30, 32 and 34 enter into the spaces 25 between rollers 27.

FIGS. 6-11 depict, in animation, how containers 76 are on and off loaded from the truck.

Container 76 has plural caster wheels 78 which rollingly engage loading dock 80. However, as will be understood hereinafter, apparatus 10 has equal utility in the lifting of containers 76 from the ground.

Figure 7:
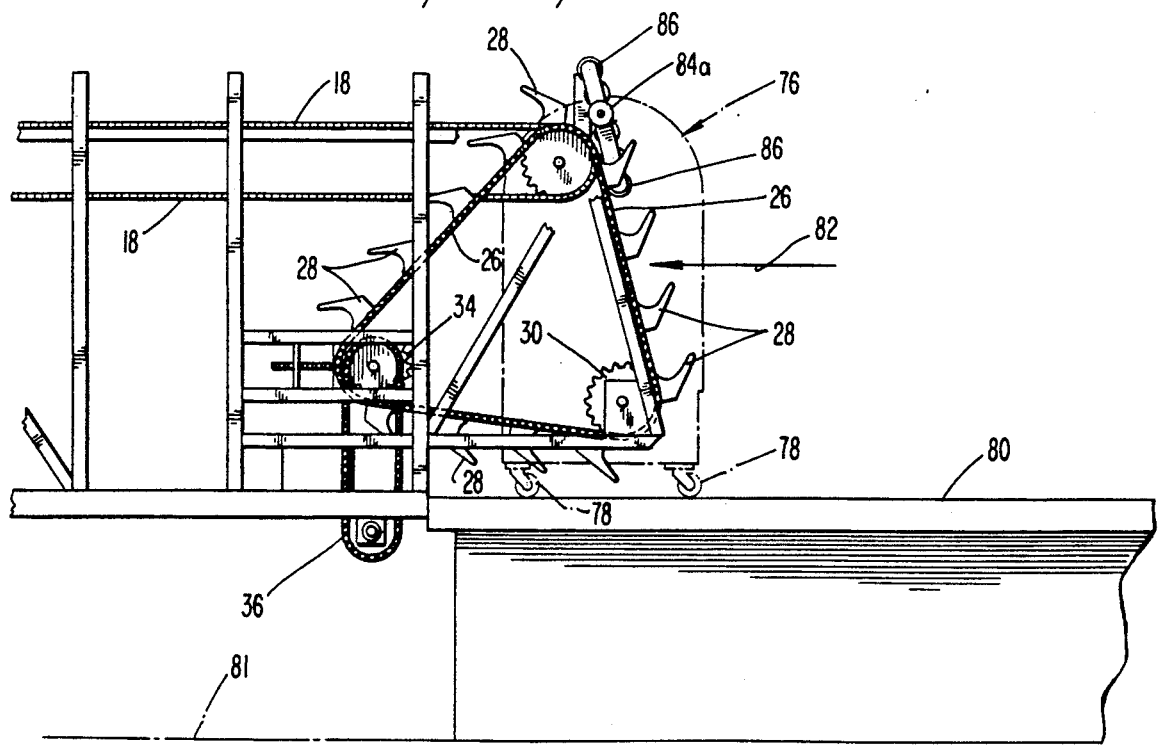
FIG. 7 is a side elevational view showing the second step in said animation.

Container 76 is lifted onto the truck by manually rolling it toward the lift hooks 28 as indicated by the directional arrow 82 in FIG. 6, until container 76 has advanced to the position depicted in FIG. 7.

The structure of container 76 is shown in increased detail in FIGS. 31-33.

Outer roller members 84a, 84b are engaged by hook members 28a, 28b, respectively, when the container 76 is being on loaded or off loaded as depicted in FIGS. 6-11.

Inner rollers, collectively denoted 86, engage horizontal chain 18 when a container 76 achieves the position indicated in FIGS. 8-11. There are five inner rollers 86 on each side of container 76 in the preferred embodiment of this invention as depicted in FIGS. 32 and 33. Importantly, three of the rollers 86 are positioned on a first side of spindle 88 and two of the rollers are positioned on a second side thereof. Thus, when the rollers are free, they align themselves in a vertical plane under the influence of gravity as depicted in FIG. 6.

The inner roller assembly is shown tilted from the vertical in FIG. 7 because it has abutted a part of the hook and chain assembly 16 but outer roller 84a has not yet been engaged by a lift hook member 28a.

Figure 8:
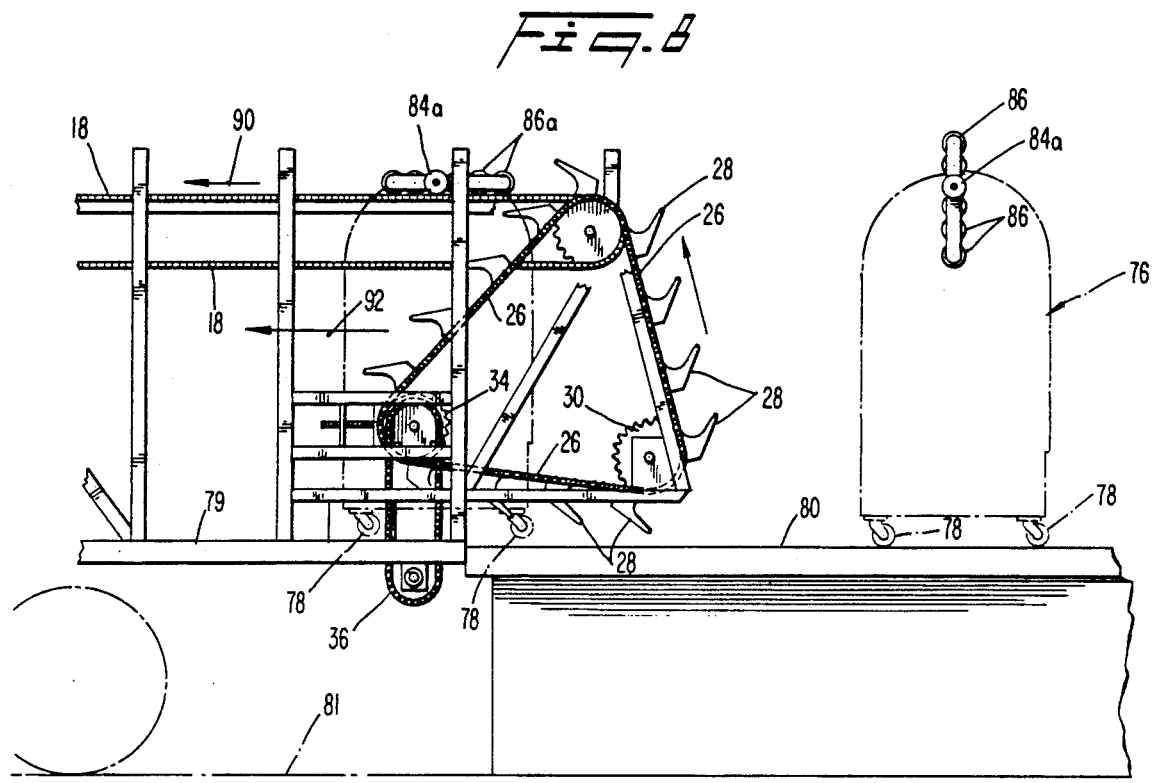
FIG. 8 is a side elevational view of the third step of said animation.

In FIG. 8, outer roller 84a has been engaged and released by a hook member 28a and inner rollers 86 have been deposited atop horizontal chain 18a. The specific shape of the hook members facilitates the transfer of the containers from the lift hooks to the horizontal chains. Chain 18a (and its counterpart, chain 18b) is rotating in a counterclockwise direction as denoted by the directional arrow 90 in FIG. 8; as will be described in detail hereinafter, chain 18 presents an upwardly projecting convexity along its extent so the concave peripheries of inner rollers 86 are easily centered thereon under the influence of gravity. Importantly, caster wheels 78 are disposed in spaced relation above truck bed 79 as shown in FIGS. 8-11 when container 76 is suspended from chains 18a, 18b. Thus, containers 76 do not encounter the friction that would be present if caster wheels 78 rotatably engaged truck bed 79. Thus, as chains 18a, 18b rotate in a counterclockwise direction, inner rollers 86a, 86b do not rotate and container 76 is carried toward the front of the truck at the speed of rotation of chains 18a, 18b. When a container member reaches the forward end of the truck and its forward progress is stopped, rollers 86a, 86b then begin rotating so that no appreciable resistance is offered to the continued rotation of chains 18a, 18b.

Figure 9:
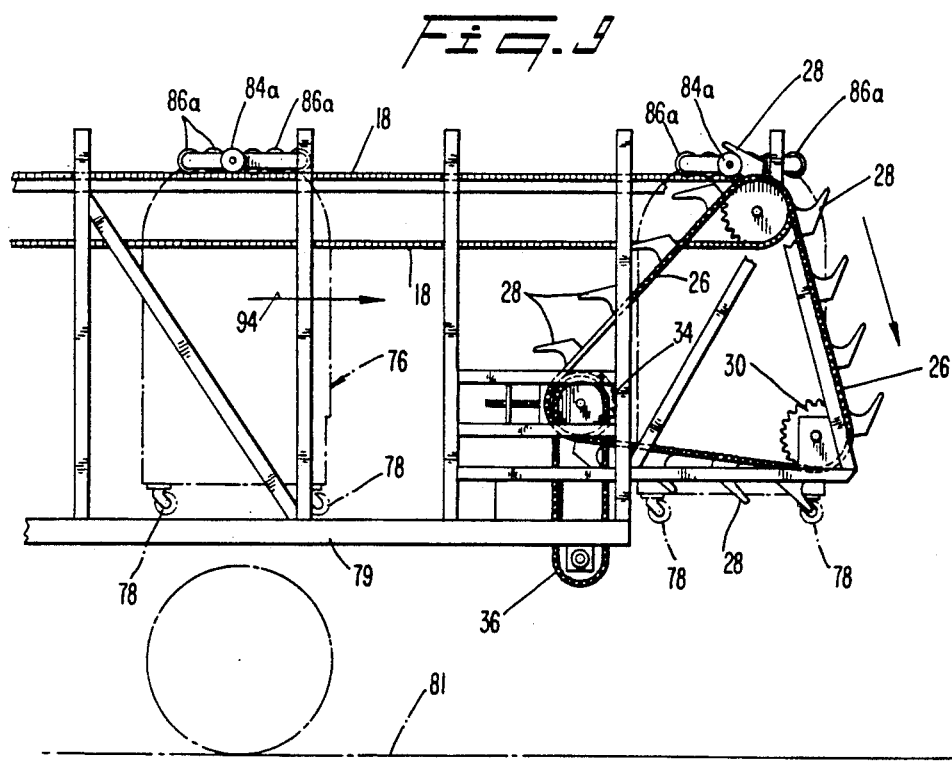
FIG. 9 is a side elevational view of the fourth step in said animation.
Figure 47:
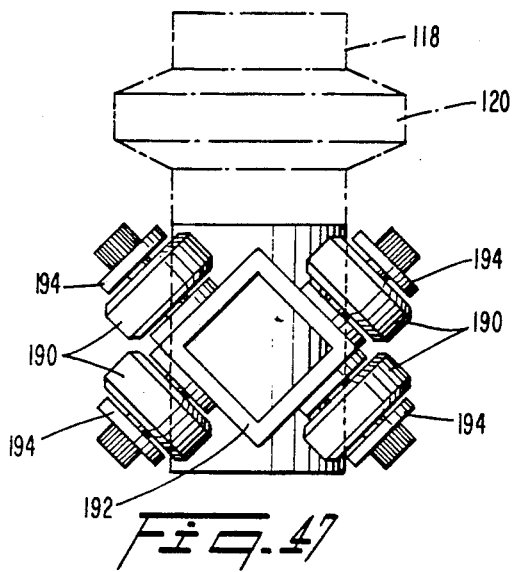
FIG. 47 shows the novel inner rollers in solid lines and the outer roller that is in engaged by the lift hooks in phantom lines.

The unloading process is depicted in FIGS. 9-11; chains 18a, 18b are now rotating clockwise; a container 76 is being carried toward the rear of the truck as indicated by arrow 94. Another container is being lowered to the ground 81 as best understood in connection with FIGS. 10 and 11, there being no loading dock 80 in these Figs. to better illustrate the versatility of the novel apparatus. Once container 76 has been deposited on the ground, it is manually rolled away from the truck as indicated in FIG. 11.

The convex upper surface of horizontal chains 18a, 18b appears in FIG. 12 but detailed depictions of the novel chain appear in FIGS. 13-22. As shown in FIG. 13, links 96 are of a first construction and alternate links 98 are of a second construction. Importantly, links 96 and 98 share a common apex 100, but sloped top walls 102 of links 96 have a greater extent than the sloped top walls 104 of links 98, as perhaps best shown in FIG. 16. This unique linkage structure enables a single pin 106 as shown in FIGS. 14-16, held by cotter pin 105, to serve as an axle means for a roller 108 and as a mounting means for each link 96, 98. More particularly, as shown in FIG. 15, a link member 98 has bulbous opposite ends 110, 112 that are centrally apertured to receive pins 106; similarly each link member 96 also has opposite bulbous ends 113 (FIG. 13) that are apertured to receive the same pin 106.

A bulbous end 113 of each link 96 always overlies (i.e., is laterally outward of) a bulbous end 112 of a link 98 when the links are assembled to form chains 18a, 18b, due to the greater extent of sloping top walls 102 of links 96 vis a vis the sloping top walls 104 of links 98.

Another link construction is shown in FIGS. 17-22; a link 98 is shown in FIGS. 17-19 and a link 96 is shown in FIGS. 20-22.

Link 98, in this embodiment, includes parts 98a, 98b that are assembled as shown in FIG. 19; bulbous ends 112, 112 of each link 98 are provided with large apertures 114, 114 that receive the opposite ends of spindle 109 upon which roller 108 is mounted.

Smaller apertures 115, 115 are formed in bulbous ends 113, 113 of link member 96; said apertures 115 receive pin 106 as shown in FIG. 22.

The assembled structures of FIGS. 14-16 and 22 thus differ in important respects such as the bifurcated structure and the provision of a spindle means in the embodiment of FIG. 22. However, both embodiments produce an articulated chain having a linear apex 100 with sloping side walls descending therefrom on opposite sides thereof to provide a centering means for inner rollers 86.

FIG. 23 reveals that battery box 24 has a hingedly mounted access lid 25; apex 100 of chains 18a, 18b and the other parts appearing in FIG. 23 have been described hereinabove.

The parts shown in FIGS. 24 and 25 have also been described above.

An alternative embodiment of the novel lifting hooks 28 is shown in FIGS. 26-28 and is denoted by the reference numeral 29 as a whole. More particularly, each hook 29 has two separate parts 29a, 29b that are spaced apart from one another by spacers 27. The double hooks 29 have flat hook-engaging edges 27 and are not used with outer rollers 84; instead they are used with rollers 116 (shown in FIG. 27A).

By contrast, the hooks 28 of planar construction are provided with a more knife-like hook-engaging edge, as distinguished from the flat hook-engaging edges of this embodiment.

As best shown in FIG. 27, flat edges 27 of each hook 29a, 29b engage the opposite cylindrical parts 118, 118 of roller 116; enlarged central part 120 maintains roller 116 in place between hooks 29a, 29b. Chain 26 that carries hooks 29a, 29b is of conventional sprocket chain construction as shown.

Before turning to a detailed description of the container embodiments, reference will first be made to FIGS. 29 and 30 which illustrate the electrical connections and controls for the novel apparatus.

As shown in FIG. 29, truck alternator 122 charges truck battery 124 through diode 123, battery 126 through diode 125 and ammeter 127, and battery 128 through diode 125. Batteries 126 and 128 are positioned in the above-mentioned battery container 24.

Lift chain motor 42 and horizontal chain motor 54 are controlled by circuitry in control box 130; the circuitry in control box 130 is activated by control buttons 72, 74 each of which includes a momentary mushroom button 71 with normally closed contacts which open when the button is pressed, thereby providing an emergency stop feature, a normally open load button 73 and a normally open unload button 75. Load and unload buttons 73, 75, unlike emergency stop buttons 71, do not activate the circuitry in control box 130 unless series/parallel switch 77 is simultaneously pressed, it being understood that one of the series/parallel switches 77 is associated with and is disposed in physical proximity to upper control buttons 72 and the other series/parallel switch 77 is associated with and is disposed in physical proximity to lower control buttons 74.

The control buttons 72, 74 are positioned on the side of the truck as depicted in FIG. 1 so that the operator must stand away from the moving lift hooks 28 or 29 when containers 76 are being on or off loaded. Moreover, the normally open momentary switches 73, 75, 77 require the operator to press said switches throughout the duration of the loading or unloading procedure. Of course, the novel apparatus would still operate if toggle type or other non-fail safe switches were used, but it would be less safe in operation.

Activation of button 77 places batteries 126, 128 in series with one another so that 24 volts DC is available to run 24 volt DC motors 42, 54; when the Autoloader (TM) is not operating, the release of normally open switch 77 returns batteries 126, 128 to a parallel connection so that they can be recharged, like truck battery 124, by alternator 122. Truck battery 124 is not used to run the DC motors. The specific parallel/series switch circuitry is denoted 132 as a whole and is of known construction.

The normally closed emergency stop buttons are conductively coupled in series to one another and are shown at the lower left hand corner of FIG. 31. Upper and lower load buttons 73 and the upper and lower unload buttons 75 are shown to the right thereof; buttons 73, 73 are connected in parallel to one another, as are buttons 75, 75. The normally closed and normally opened switches are conductively coupled to terminal strip 134 as shown, and the wiring diagram shows how the horizontal chain motor control 136 and the lift chain motor control 138 are constructed.

When containers 76 are to be loaded from the ground or from a loading dock, a first container is positioned between the laterally spaced lift hooks 28 or 29 as shown in FIGS. 6 and 7; the operator then depresses "load" button 73 of button panel 72 if he or she is standing on a loading dock, or "load" button 73 of button panel 74 if standing on the ground, and simultaneously depresses the associated parallel/series switch button 77 to place the twelve volt DC batteries 124, 126 in series so that the 24 volt DC motor can operate. Activation of said buttons starts the counterclockwise (in FIG. 1) rotation of chain 26 and of hooks 28 or 29. Accordingly, container 76 is lifted. When a container reaches sensor 64, horizontal chains 18a, 18b are activated to rotate in a counterclockwise direction; chains 26a, 26b continue rotating to fully deliver the container to the horizontal chains 18a, 18b. After the container has been deposited atop the horizontal chains 18a, 18b, it will begin traveling toward the front of the truck. As it passes second sensor means 66, lift chains 26a, 26b are deactivated to allow the first container to reach its forwardmost position before a second container is loaded. A second container is then placed into position, and the above steps are repeated. As mentioned earlier, inner rollers 86 rotate only when a container has reached its forwardmost position and chains 18a, 18b are rotating to load additional containers.

To unload the truck, the operator presses the parallel/series switch 77 and the "unload" switch 75 simultaneously. This activates lift chain motor 42 to operate in the direction that causes chains 26a, 26b to appear to rotate in a clockwise direction if viewed from the left side of the truck.

The third sensor means 68 senses the position of a load hook 28 or 29 when it is 0-5 degrees past vertical; the hook 28 depicted in FIG. 1 at the highest point of chain 26 is substantially at 0-5 degrees past vertical. This position orients the uppermost hook into its proper position so that unloading may commence. Accordingly, when sensor means 68 senses a hook in said position, the lift chain 26 is deactivated and the horizontal chain 18 is activated so that it rotates in a clockwise direction, i.e., so that the containers begin traveling toward the rear of the truck.

When a rearwardly-traveling container is engaged by the uppermost hook, a fourth sensor means 70 senses that the container is in the hooks and reactivates lift or load chains 26a, 26b to carry the container down to the dock 80 or ground 81. At this time, both the horizontal chains 18a, 18b and the load chains 26a, 26b are running in a forward to rearward direction. When the first sensor means 64 senses the container, horizontal chains 18a, 18b are then deactivated to conserve battery power and to stop the rearward travel of the containers still on the truck, but the load chain continues running. When the container reaches the loading dock or the ground the operator releases buttons 75, 77 which ends the unloading operation for that container. The container is then rolled away from the truck on its caster wheels 78, and the unloading procedure described above is repeated.

If the operator releases buttons 75, 77 prematurely, i.e., during the unloading process, and then presses them again, fourth sensor means 70 will not allow the bringing of another container toward the rear of the truck until a container in the hooks has cleared said fourth sensor. The fourth sensor always detects whether or not a container on the ground or dock has been pulled away from the truck; if not, the horizontal chain 18 cannot be reactivated. However, if load chain 26 is reactivated in its "unload" mode before an unloaded container has been pulled away, the hooks 28 or 29, due to their curvature, will simply engage outer load rollers 84a, 84b and push the container away from the truck.

Further details of a first embodiment of the novel containers 76 are shown in FIGS. 31-42. Handles for pulling or pushing the containers while on the docks or on the ground are denoted 140. Handles 140 extend horizontally along the extent of each side wall of each container as best seen in FIGS. 34 and 35.

The means for opening the container is best shown in FIGS. 34-37.

Each container has a closure means or lid 142; lid 142 is shown in its closed configuration in FIGS. 34-37 and in its open configuration in FIGS. 41 and 42.

The left and right side walls of the container have arcuate top ends as shown. Thus, the back wall 152 of each container is curved forwardly to conform thereto and the lid 142 curves backwardly to conform thereto.

The three linear arms shown in FIGS. 34 and 35 are denoted 144, 146 and 148; each arm is fixedly secured to rotatably mounted mounting plate 150 at its radially innermost end. It should be understood that an identical set of three arms and a mounting plate are positioned on the opposite side of the container.

Plate 145 is fixedly secured to the radially outermost end of arm 144 and is disposed normal thereto so that its longitudinal axis of symmetry is tangent to the radius of curvature of lid 142. As best shown in FIG. 37, an angle iron 143 is fixedly secured to lid 142 along its rear edge and rod 147 is fixedly secured to the angle iron as shown. The trailing edge of lid 142 is downturned as at 149 and the leading edge of the container's back wall 152 is upturned as at 151 to form a watertight seal so that the container may be left outdoors without damage to its contents.

To open lid 142, handle 146 is rotated in the direction indicated by comparison of FIGS. 34 and 35. This causes downwardly turned trailing edge 149 of lid 142 to slide relative to back wall 152 until it reaches its FIG. 35 position where it is stopped by a corner angle iron 154. Lid 142 will then be in a horizontal position as depicted in FIG. 35; lip 141 directs precipitation toward the rear of the container so that a person standing under lid 142 is fully protected from the elements.

When lid 142 is closed, it overlies the truncate forward wall 143 of the container as shown.

A plurality of horizontally disposed strengthening ribs, collectively denoted 158, are formed in back wall 152 of container 76, and a similar rib 159 is fixedly secured to the back of lid 142.

As shown in FIG. 40, the base of container 76 includes elongate angle iron members 160, 162 interconnected by plural, laterally spaced angle iron members, collectively denoted 164.

FIG. 41 depicts a container 76 that has been modified by the addition of plural vertically spaced shelves 166, a false bottom 168 and a hingedly mounted door means 170 to provide access into the storage compartment created by the false bottom. When modified in this manner, container 76 provides a portable store for the retail sale of goods displayed on shelves; as the displayed goods are sold, additional goods are removed from the storage compartment and displayed on the shelves.

FIG. 42 depicts a container 76 that serves as a hotdog stand or other food outlet. The height of container 76 is such that a person of average height can stand and walk around therein. The interior of the container includes plural open shelves 166, enclosed shelves 172, a cash drawer 174, counter tops 176, and suitable cooking facilities, not shown. Containers of this type can be delivered to state and county fairs, and miscellaneous crowd-drawing special events.

An alternative embodiment of container 76 and related parts is shown in FIGS. 43-60. Importantly, the container of the second embodiment is formed of two separate parts; since it is radically different from container 76, it is assigned reference numeral 180.

In FIG. 43, a container 180 is shown on loading dock 80, another container 180 is shown in phantom lines, already loaded onto the novel truck 10.

Handles for rolling container 180 on its caster wheels 78 are denoted 182 and 184 in FIG. 43, but are more clearly shown in the Figs. that follow.

Each of the separate parts of container 180 are generally "L"-shaped as shown in FIGS. 44 and 45. A first part is denoted 186 and a second part is denoted 188. When the "L"-shaped parts are interlocked to one another in the manner hereinafter shown and described, they form a unitary structure having a rectangular appearance when seen in plan view. Each container part has a top wall or roof, a bottom wall or floor, two side walls and a back wall; accordingly, each container 186, 188 has an open front.

As shown by the straight and arcuate arrows 190 and 192 in FIGS. 44 and 45, respectively, each of parts 186, 188, being mounted on caster wheels 78, may be separated from one another in the respective manners depicted. When separated, they may be placed in side by side relation to one another or may be positioned in locations remote from one another.

A worker in preparing container 180 for loading need not make any specific alignment of the assembled unitary structures 180 except as shown in FIG. 43, i.e., handles 182, 184 must be generally transversely disposed as depicted in FIG. 43 to enable lift hooks 29 to engage the novel outer rollers associated with each part 186, 188. Of course, since a worker must push either handle 182 or 184 in order to roll container 180 toward the hooks 29, the required alignment will be natural and will not involve any decision making.

Importantly, the inner roller members that engage horizontal chain 18 are specifically configured so that container 180 may be presented to hooks 29 in the position depicted in FIG. 43, or in a position 180 degrees turned around therefrom. Thus, the worker may manipulate either handle 182 or 184 when pushing container 180 into hooks 29. As perhaps best shown in FIGS. 46-48, a plurality of inner roller members, collectively denoted 190, are rotatably mounted to each side of a square in cross section tubular member 192. The tubular member 192 and rollers 190 arranged thereabout, along the extent thereof, are disposed in a vertical plane when the container 180 is standing free of truck 10 as depicted on the right side of FIG. 43, and in a horizontal plane when the container is loaded as shown on the left side of FIG. 43.

Figure 48:
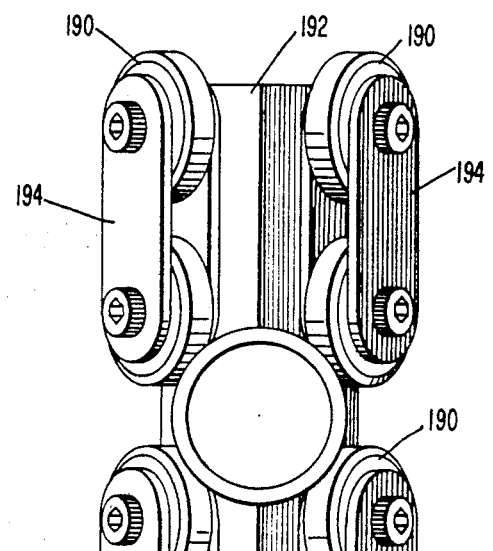
FIG. 48 is a perspective view of the novel inner rollers of this embodiment.

Although sets of rollers 190 are shown in FIG. 48 as being linked by link members 194, many different configurations are within the scope of this invention.

Figure 49:
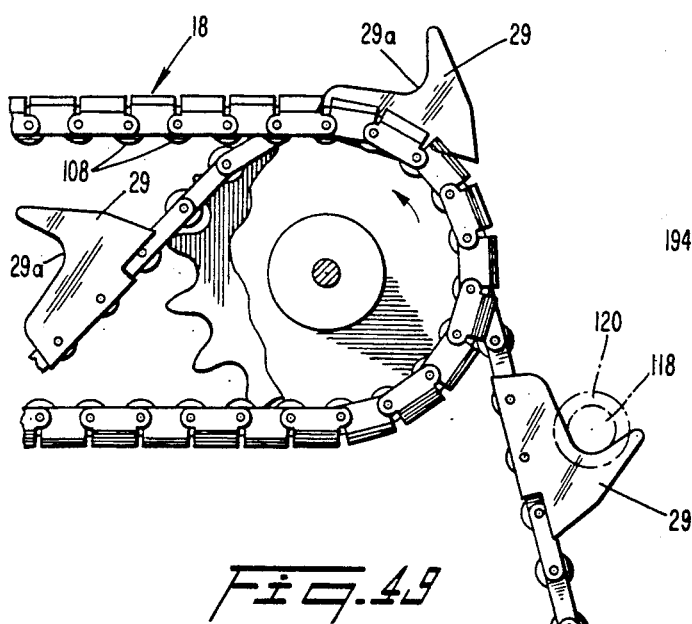
FIG. 49 is a side elevational view showing, in detail, how the lift hooks transfer the containers to the horizontal load chain of the truck.

As mentioned earlier, each of the double hook members 29 (FIG. 49), engage their associated outer roller 120 and lifts each assembly of inner rollers 190 and hence container 180. It is critical to note the shape of lift hooks 29; as shown in FIG. 49, each hook 29 (and hook 28 of the first embodiment of hooks) has an arcuate leading edge 29a that cradles outer roller 120 during the lifting process and which discharges it when a hook reaches it uppermost position. Specifically, as shown in FIG. 49, an outer roller 120 cradled by the hook 29 appearing at the top of FIG. 49 will begin to roll or slide out of said hook when said hook has attained such position. By the time the hook 29 has reached the position of the hook appearing at the extreme left hand side of FIG. 49, the container 180, or more specifically, inner rollers 190, will have been deposited atop horizontal load chain 18. Of course, the converse is also true, i.e., the container will just as easily roll out of its engagement with the hooks when the hooks are rotating in their unloading direction.

Returning now to the container proper, parts 186 and 188 are shown in side by side relation to one another in FIG. 50.

It is important to appreciate from the outset that both parts 186, 188 are identical to one another in all respects and may be thought of as being mirror images of one another. Thus, there is no possibility that a busy worker might mismatch two parts while assembling the unitary structure. Since both halves of the container are identical, the same reference numerals will be applied to each, and reference will sometimes be made to only one of the parts, but it should be understood that such reference applies identically to the other part as well.

One of the most important features of each part of the structure is the protruding or raised "V"-shaped angle iron member 196 (shown at the extreme left of FIG. 50 on one part and at the center thereof on the other part) that extends, at an incline from the vertical, from the top of each part to the base thereof as shown, and which is positioned on the side of each part at the forward edge thereof.

A complementally formed or recessed "V"-shaped angle iron member 198 which is simply a reversely positioned angle iron, is positioned at the opposite forward side of each part as shown. It should be clear from FIG. 50 that when parts 186 and 188 are placed into juxtaposition with one another, the inwardly configured member 198 of part 188 will receive the outwardly projecting member 196 of part 186 and the outwardly projecting member 196 of part 188 will mate with its counterpart 198 on part 186, thereby serving to interlock the two parts into a unitary structure.

When the two container parts 186, 188 are not interlocked with one another, i.e., when they are separated from one another as depicted in FIG. 50, they may be used in many varying configurations for widely varied purposes. For example, the phantom lines 199 in FIG. 50 depict possible shelving arrangements that could be employed to display goods for sale. The interior of each container part can also be equipped as a fast food store or other retail establishment as well. Of course, no shelving or other structure is added to the interior of the container parts if said parts are used as bulk containers.

Elongate, flat metal plates, collectively denoted 200, provide important structural reinforcement for the container parts as will become more clear as this description proceeds.

Center column 202 is not inclined as are the "V"-shaped angle irons 196, 198, but it is mounted on the forward (open) end of its associated container part.

The floor or bottom wall of each container part slopes downwardly from the front of each container part to the back thereof; the floor is denoted 204 and its rearward slope is indicated by shade lines. In this manner, articles such as newspapers may be tossed into a container part 186, 188 and a stack thereof will lean against back wall 203 so as not to topple out when the container parts are separated, it being understood that parts 186, 188 are open in the front and are effectively closed only when joined together in confronting relation to one another.

The forward end of floor plate 204 is supported by transverse frame member 206 and the rearward end of said floor plate 204 is supported by transverse frame member 208. Another transverse frame member 210, positioned mid-way between said forward and rearward frame members, supports the middle of floor plate 204.

Each container part is supported by eight caster wheels 78, there being four sets of two wheels each, each set of wheels being positioned at the corner of a square frame means.

The forward, transverse frame member of the caster wheel frame is denoted 212 in FIG. 50.

As will be more fully described hereinafter, when parts 186, 188 are interlocked with one another, they are latched together to insure against separation. The latching apparatus is partially shown at the bottom of FIG. 50; the latch assembly is denoted 214, generally, and the catch associated therewith is denoted 216. Advantageously, the latch assembly is disposed in a recessed location, as shown, so that a worker manipulating handles 182 or 184 will not be tripped thereby.

FIG. 51 is a top plan view of a unitary container 180 when parts 186, 188 are interlocked with one another and when said container is suspended slightly above the truck bed by the engagement of inner rollers 190 on horizontal load chains 18a, 18b. Elongate brace members, collectively denoted 214, extend as shown from upstanding roller support member 216 positioned at the laterally outward side of the container to a longitudinally disposed channel member 218 positioned at the laterally inward side of the container, at the top thereof. Importantly, each brace member 214 slopes slightly downwardly from its apex to its side, as shown in FIGS. 53–55.

Figure 54:
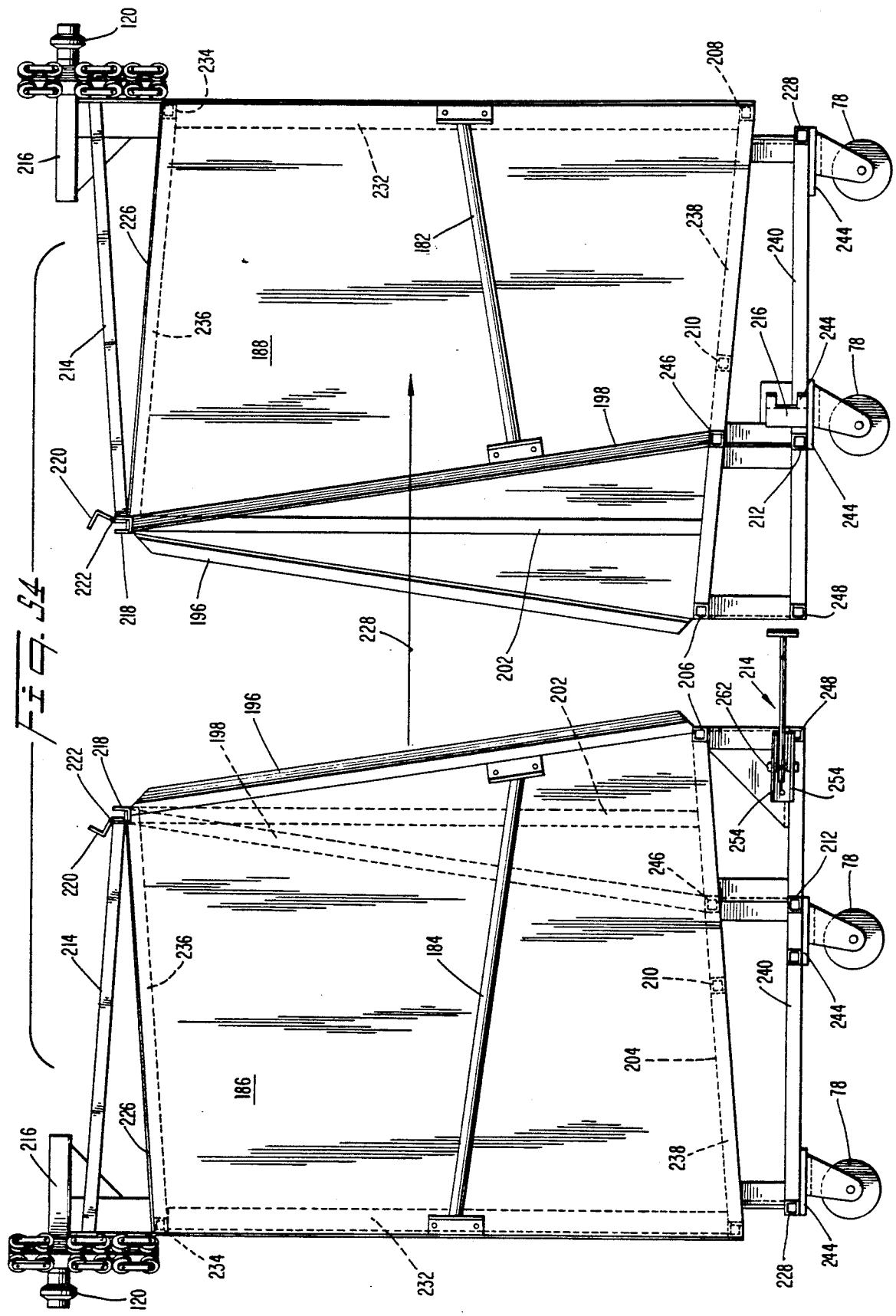
FIG. 54 is a side elevational view of the two parts of the container of the second embodiment disposed in confronting relation to one another.

Each channel member 218 is upwardly opening; an elongate closure member 220 having a longitudinal extent equal to the longitudinal extent of each channel is hingedly mounted as at piano hinge 222 to each channel 218, along a top edge thereof as best shown in FIG. 54. In FIG. 51, the closure member 220 of container part 186 is in the "up" position as depicted in FIG. 55 and the closure member 220 of part 188 is in its closed position as also shown in FIG. 55.

In FIG. 54, both closure members are depicted in their respective "open" positions. Importantly, both closure members 220, 220 are twice as wide as each channel member 218, 218; accordingly, each closure member 220 will close both channels 218, 218 when in its closed positioned as shown in FIG. 55.

Channel members 218 are employed to provide a mounting means for the laterally inward ends of brace members 214 as aforesaid; the closure members 220, 220 are employed to shelter the channels so that rain or other forms of precipitation cannot get between container parts 186, 188. By providing both channel members 218 with a double wide closure means, no mismatch of parts can occur.

The parting line between container parts 186, 188 is denoted 224 in FIG. 51.

FIG. 52 shows a container part 186 or 188 in plan view; projecting angle iron member 196 and inverted angle iron member 198 are shown, as is closure member 220 in its open configuration.

A side view of a container part 186 or 188 is provided in FIG. 53. Closure member 220 is again depicted in its open configuration. Sloping container roof 226 is best shown in FIGS. 54 and 55.

To assemble parts 186, 188, they are positioned in facing relation to one another as shown in FIG. 54 and moved toward one another as suggested by directional arrow 228.

The parts 186, 188 when abutting one another, are shown in front elevation in FIG. 55. Note the abutting center beams 202, 202 and the mating engagement of angle irons 196, 198. Note also that latch means 214 is now engaging catch means 216.

When container 180 is lifted by hooks 29 engaging the cylindrical rod member 118 which forms a part of the outer roller assembly as above-mentioned, container parts 186, 188 would separate at their lower parts were it not for the latch and catch assembly, 214, 216. Conversely, the upper parts of container parts 186, 188 will compress toward one another when the container is lifted. Thus, with the bottom parts latched together, a strong unitary structure is produced when container 180 is lifted as aforesaid.

FIGS. 54 and 55 also show other frame members that were either not shown or not pointed out in the description of FIG. 50. Specifically, in FIGS. 54 and 55 may be seen longitudinally extending rear caster frame members 228, truncate caster frame members 230, upstanding angle members 232, longitudinally extending upper rear frame members 234, container roof support members 236, container floor support members 238, transversely extending caster frame members 240, diagonally extending caster frame brace members 242, caster wheels mounting plate members 244, truncate support members 246 for supporting the respective lower ends of the mating "V"-shaped members 196, 198, and forward, lower frame members 248.

FIG. 58 shows clearly how members 196 and 198 engage one another when container parts 186 and 188 are in their FIG. 55 position.

This disclosure concludes with a description of the latching means shown in detail in FIGS. 59 and 60. Catch means 216 is made of two permanently mounted flat plates 250, 252; plate 250 includes a pair of transversely opposed laterally spaced apart arm members and a bight portion therebetween that receives and cradles latch means locking bar member 254. The free end 256 of locking bar member 254 is "T"-shaped so that it cannot withdraw from the bifurcated free end of plate member 250 when the latch assembly is locked closed in its position as depicted in FIG. 59.

A latch handle member 258 is fixedly secured to generally "T"-shaped bracket 260, and bracket 260 is pivotally mounted as at 262 between a pair of vertically spaced, horizontally extending ear members 264. Thus, pivoting handle member 258 as indicated by directional arrow 266 effects displacement of locking bar member 254 along its longitudinal axis, as indicated by directional arrow 268 in FIG. 60, and hence allows pivoting of locking bar member 254 about pivot point 270 so that said locking bar may be removed out of its FIG. 59 locked position, as suggested by the phantom line position of said locking bar at the lower right hand corner of FIG. 60. Container parts 186, 188 may then be separated from one another as indicated by directional arrow 272.

The invention as described was developed for the bulk transportation of newspapers, but it has utility in connection with the transportation of other items, too numerous to list exhaustively, such as soft drink bottles, food items, garbage, precious metals, and so on. The containers are secure and may be left unguarded for long periods of time if convenience requires. Thus, where the delivery of valuable items by conventional methods requires the presence of one or more individuals to accept the delivery, the present invention enables the driver to off load the containers wherever needed even when no one is available to receive the delivery at the time it is made. Accordingly, this inventive system will have a positive impact on productivity in many industries.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A self-loading truck for loading containers having interfacing means, comprising:
   an elongate truck bed having a forward end and a rearward end;
   lifting chain means mounted at the rearward end of said truck bed for releasably engaging said interfacing means and lifting and suspendedly supporting said containers to be loaded from a support surface onto said truck, said lifting chain means includes a pair of laterally spaced lift chain members, each member of said pair being disposed on an opposite side of said truck bed relative to the other member of said pair and each chain member forming a continuous loop;
   horizontally disposed displacement chain means for suspendedly supporting above said truck bed containers lifted from said support surface by said lifting chain means;
   said displacement chain means being mounted to said truck and extending substantially the entire longitudinal extent of said truck bed, said displacement chain means includes a pair of laterally spaced, horizontally disposed chain members, each member of said pair of horizontal chain members being disposed on an opposite side of said truck bed relative to the other member of said pair of horizontal chain members and each horizontal chain member forming a continuous loop; and
   said lifting chain means being closely spaced to a rearward end of said displacement chain means so that containers lifted by said lifting chain means are deposited by said lifting chain means onto said displacement chain means.

2. The truck of claim 1, wherein said lifting chain means further includes a plurality of equidistantly spaced lift hook means fixedly secured to each of said lift chain members.

3. The truck of claim 2, further comprising of plurality of gear members for meshingly engaging said chain members, said gear members including a first and second set of gear members associated with different members of said pair of chain members.

4. The truck of claim 3, wherein each set of gear members forms a triangular array so that each of said chain members follows a triangular path of travel.

5. The truck of claim 4, wherein each set of gear members includes an uppermost gear member that is disposed a predetermined distance above said truck bed.

6. The truck of claim 5, further comprising a first transversely disposed shaft means that interconnects the lift chain members so that rotation of a first lift chain member effects simultaneous and corresponding rotation of a second lift chain member.

7. The truck of claim 6, wherein said displacement chain means further comprises a pair of longitudinally spaced, rotatably mounted gear members that meshingly engage opposite ends of each member of said pair of horizontal chain members.

8. The truck of claim 7, wherein each of said horizontal chain members are disposed in a vertical plane, and wherein each of said horizontal chain members follow an oblong path of travel.

9. The truck of claim 8, wherein said horizontal chain members are disposed a predetermined distance above said truck bed.

10. The truck of claim 9, wherein each of said uppermost gear members of said triangular array of gear members and an uppermost part of each of said horizontal chain members are disposed in a substantially common horizontal plane so that containers lifted by said lift hook means are easily transferred to said horizontal chain members.

11. The truck of claim 10, further comprising a first reversible motor means for selectively rotating said lift chain members in a first direction and in a second direction opposite to said first direction.

12. The truck of claim 11, further comprising a second reversible motor means for selectively rotating said horizontal chain members in a first direction and in a second direction opposite to said first direction.

13. The truck of claim 12, further comprising first control means conductively coupled to said first motor means, said first control means including a switch means for starting rotation of said first motor means in said first direction, means for starting rotation of said first motor means in said second direction, and emergency stop means.

14. The truck of claim 13, further comprising second control means conductively coupled to said second motor means, said second control means including means for starting rotation of said second motor means in said first direction, means for starting rotation of said second motor means in said second direction, and emergency stop means.

15. The truck of claim 14, further comprising a pair of rechargeable battery members conductively coupled to said first and second motor means.

16. The truck of claim 15, wherein said first and second motor means are DC motor means.

17. The truck of claim 16, further comprising a parallel/series switch means electrically connected in series relation between said first and second control means and said first and second motor means so that said first and second motor means can be activated only when said switch means and a selected control means are simultaneously activated.

18. The truck of claim 17, wherein said parallel/series switch means is conductively coupled to said pair of battery members so that said battery members are selectively electrically connected to each other in parallel when so selected and series when so selected so that said battery means may be connected in parallel electrical relation to one another when said batteries are being recharged by an alternator means associated with the engine of said truck and so that said battery means may be connected in series electrical relation to one another when said first and second motor means are activated by said first and second control means.

19. The truck of claim 2, wherein each of said hook means is a planar in configuration hook member.

20. The truck of claim 2, wherein each of said hook means is a pair of planar in configuration hook members laterally spaced apart from one another a predetermined distance.

21. The truck of claim 14 further comprising a plurality of sensor means electrically connected between said first and second control means and said first and second motor means and physically disposed in preselected positions near said lifting means and said track means to sense the respective positions of said lifting and track means and of containers lifted and supported thereby so that said first and second motor means are activated and deactivated by said first and second control means and by said sensor means.

22. The truck of claim 2, wherein each of said horizontal chain members are formed of plural link members, and wherein each of said link members has a generally convex contour.

23. A self-loading truck for loading containers having interfacing means, comprising:
   an elongate bed member having a forward end adjacent a cab of said truck and a rearward end remote therefrom;
   a first elongate rotatably mounted continuous chain member that follows an oblong path of travel;
   said first chain member being horizontally disposed and rotatable in a vertical plane at a first side of said truck bed at a predetermined height thereabove, and extending from the rearward end of said truck bed to the forward end thereof;
   a second elongate rotatably mounted continuous chain member that follows an oblong path of travel;
   said second chain member being horizontally disposed and rotatable in a vertical plane at a second side of said truck bed at the same predetermined height thereabove as said first chain member and extending from the rearward end of said truck bed to the forward end thereof;
   first motor means for rotating both of said first and second horizontal chain members at a common rate of rotation;
   a third rotatably mounted continuous chain member disposed and rotatable in a vertical plane;
   said third chain member following a triangular path of travel;
   said third chain member being partially disposed rearwardly of the rearward end of said first chain member in closely spaced proximity thereto;
   a first plurality of rearwardly extending hook members secured to and carried by said third chain member;
   a fourth rotatably mounted continuous chain member disposed and rotatable in a vertical plane;
   said fourth chain member following a triangular path of travel;
   said fourth chain member being partially disposed rearwardly of the rearward end of said second chain member in closely spaced proximity thereto;

a second plurality of rearwardly extending hook members secured to and carried by said fourth chain member;

each hook member of said first and second plurality of hook members sequentially traveling from a lowermost and rearwardmost first position to an elevated, uppermost second position, thence to a third position below said elevated position and forwardly thereof and thence returning to said first position;

said elevated second position being at a height substantially equal to the predetermined height of said first and second chain members;

whereby a container'interfacing means are engaged and lifted by said hook members and is deposited by said hook members onto said first and second chain members when said hook members rotate past said second position.

* * * * *